United States Patent
Igari

(10) Patent No.: US 8,293,352 B2
(45) Date of Patent: Oct. 23, 2012

(54) OPTICAL RECORDING MEDIUM AND METHOD FOR MANUFACTURING THE SAME

(75) Inventor: Takahiro Igari, Miyagi (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/630,312

(22) Filed: Dec. 3, 2009

(65) Prior Publication Data

US 2010/0080948 A1   Apr. 1, 2010

(30) Foreign Application Priority Data

Dec. 4, 2008   (JP) ................ P2008-310318

(51) Int. Cl.
*B32B 3/02*   (2006.01)
(52) U.S. Cl. ............... 428/64.1; 428/64.4; 428/64.5; 428/64.6; 430/270.13
(58) Field of Classification Search .......... 428/64.4; 430/270.13
See application file for complete search history.

(56) References Cited

U.S. PATENT DOCUMENTS

| | | | | |
|---|---|---|---|---|
| 7,643,401 B2 * | 1/2010 | Takahashi et al. | ......... | 369/275.4 |
| 2004/0252622 A1 * | 12/2004 | Kariyada | ......... | 369/275.2 |

FOREIGN PATENT DOCUMENTS

| | | |
|---|---|---|
| JP | 63-276724 | 11/1988 |
| JP | 06-195753 | 7/1994 |
| JP | 11-086340 | 3/1999 |
| JP | 2001-023239 | 1/2001 |
| JP | 2005-133105 | 5/2005 |
| JP | 2007-058375 | 5/2007 |
| WO | 2007069672 | 6/2007 |

OTHER PUBLICATIONS

Japanese Office Action for JP2008-310318 dated Aug. 31, 2010.

* cited by examiner

*Primary Examiner* — Elizabeth Mulvaney
(74) *Attorney, Agent, or Firm* — K&L Gates LLP

(57) ABSTRACT

An optical recording medium includes: a substrate; an information signal layer provided on the substrate; and a protective layer provided on the information signal layer. The information signal layer is provided with a reflecting layer, a recording layer provided on the reflecting layer and first, second and third dielectric layers laminated successively on the recording layer. Refractive indexes of the first, second and third dielectric layers are different from each other between the adjacent dielectric layers to each other. Among the first, second and third dielectric layers, the dielectric layer having the highest refractive index contains, as a main component, at least one member selected from the group consisting of titanium oxide, niobium oxide and a mixture of zinc sulfide and silicon oxide. The dielectric layer having the highest refractive index has a refractive index of 2.3 or more at a wavelength of 405 nm.

14 Claims, 16 Drawing Sheets

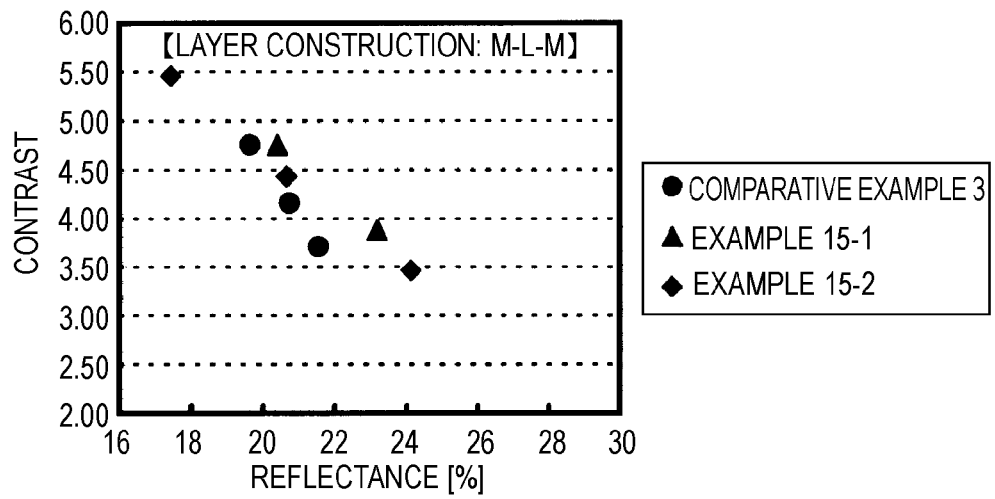
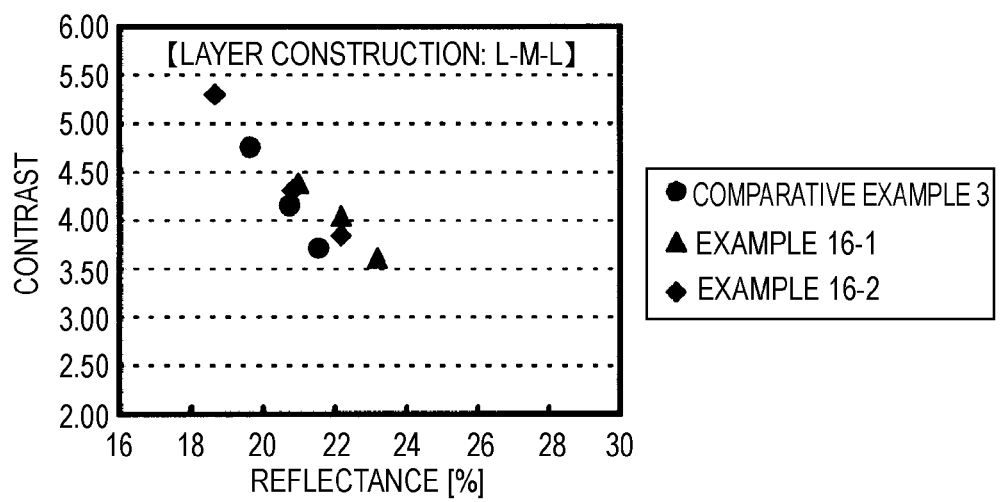
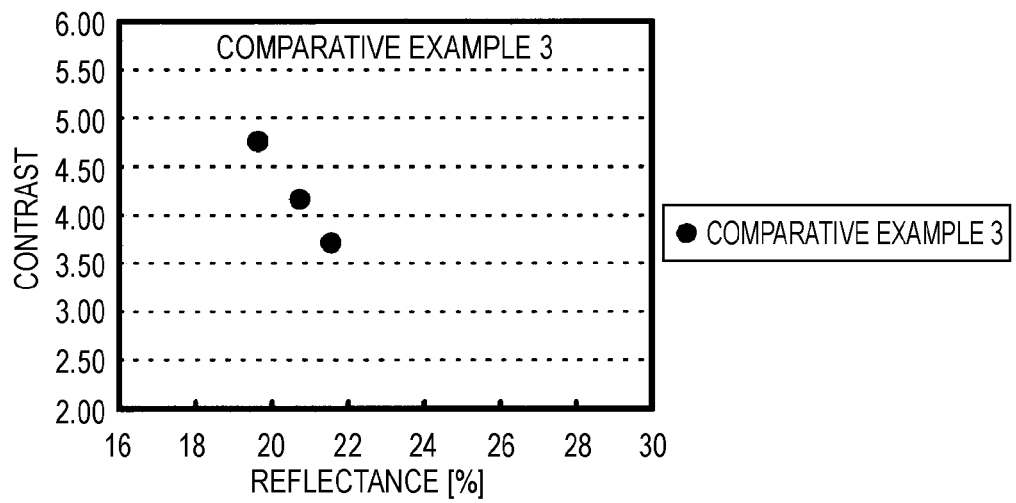

OPTICAL RECORDING MEDIUM AND METHOD FOR MANUFACTURING THE SAME

CROSS REFERENCES TO RELATED APPLICATIONS

The present application claims priority to Japanese Priority Patent Application JP 2008-310318 filed in the Japan Patent Office on Dec. 4, 2008, the entire contents of which is hereby incorporated by reference.

BACKGROUND

The present application relates to an optical recording medium and a method for manufacturing the same. More particularly, the present application relates to an optical recording medium provided with plural information signal layers.

In recent years, copyright protecting technologies in a DVD-ROM (Digital Versatile Disc-Read Only Memory), a recording type DVD and the like are widely known. As one of them, there is known a technique in which binary information inherent to a medium, which is called a media ID, is recorded in an innermost rim side area (Burst Cutting Area: BCA) in a state of an unrecorded disc, and a content data is encrypted by using this media ID.

Also, in a high-density optical disc such as a Blu-ray Disc (a registered trademark: BD) or the like, there is proposed a technique in which a bar code-like mark (hereinafter referred to as "BCA mark") which is binary information is recorded in BCA (see JP-T-2005-518055).

JP-T-2005-518055 discloses that the BCA mark is recorded while utilizing a crystalline state and an amorphous state of a phase change recording layer. Also, JP-T-2005-518055 discloses that grooves or pits are formed in the BCA at a track pitch of five or more times the track pitch of an adjacent area. Furthermore, JP-T-2005-518055 discloses that the BCA mark is formed in the radial direction so as to traverse plural tracks.

The BCA can be formed in the following manner.

For example, at the manufacturing stage, in the state before initialization but just after fabrication of a recording layer, the recording layer is in an amorphous state. With respect to a data area, for example, by executing the initialization upon being irradiated with a laser beam by a red high-power laser on the whole area, the recording layer is changed from an amorphous state to a crystalline state. On the other hand, with respect to the BCA, the recording layer is not set in a crystalline state by initializing the whole BCA but set in a crystalline state by irradiating a laser beam only on a desired portion in the circumferential direction in correspondence to the BCA mark, for example, a pattern of a bar code corresponding to the contents of a disc ID. As a result of this processing step, in the BCA, information recording in a bar-code form by a pattern based on a bar portion in the amorphous state of a desired width along the circumferential direction and a bar portion in the crystalline state is executed.

In recent years, for the purpose of increasing the memory capacity in a recordable DVD or a high-density optical disc such as BD or the like, there is proposed a recording and reproducing format of a multilayer optical recording medium. In a double-layer high-density optical recording medium, for example, a double-layer BD, a BCA mark is recorded on an information signal layer locating on the far side of the information reading side (referred to as "L0 layer"; an information signal layer locating on the near side of the information reading side will be referred to as "L1 layer").

FIG. 18 shows an example of a waveform of a reproduction signal of a BCA mark of such a double-layer BD. In the crystalline state, since a reflectance is high, a reproduction signal of a high level IH is obtained; and in the amorphous state, since a reflectance is low, a reproduction signal of a low level IL is obtained. A ratio between IH and IL, namely a BCA modulation degree defined by an expression: IH/IL is specified to be 4 or more in view of the standards (3.5 or more while defining a numeral to 1 decimal place as significant figures).

SUMMARY

In the double-layer BD, the recording or reproduction of an information signal layer on the L0 layer or L1 layer is executed by selectively bringing each of the information signal layers into focus. In general, in both of the L0 layer and the L1 layer, a phase change recording film for recording an information signal while utilizing a phase change of the recording material upon irradiation with a laser beam is used. In general, the L0 layer is constructed by a protective layer, a recording layer, a protective layer and a reflecting layer from the incident side of a laser beam. Though the L1 layer has substantially the same layer construction, an alloy material of about 10 nm or thinner is used for any of the recording layer or the reflecting layer. For that reason, a light transmittance of the L1 layer is restricted, and furthermore, the light transmittance is further decayed depending upon optical characteristics of a material to be used as the protective layer, especially its extinction coefficient. Reduction in the transmittance of the L1 layer is related to decay of the laser beam to be inputted into the L0 layer via the L1 layer and decay of the reproduction signal of the L0 layer reflected on the L0 layer. For example, a reflectance R1, an absorptance A1 and a transmittance T1 of the L1 layer are set up to be 5%, 45% and 50%, respectively. Also, a reflectance R0, an absorptance A0 and a transmittance T0 of the L0 layer are set up to be 20%, 0% (since the L0 layer is not required to transmit the laser beam therethrough, it is possible to distribute it to only reflection and absorption) and 80%, respectively. In the case where the respective parameters are set up in this way, when a laser Pr inputted from the surface is defined as 100%, a component Pr0 of the light which passes through the L1 layer, is focused and reflected in the L0 layer and then returns to the surface through the L1 layer is 5% as shown in FIG. 19 and according to the following expression.

$$Pr0 = Pr \times T1 \times R0 \times T1 = 100 \times 0.5 \times 0.2 \times 0.5 = 5[\%]$$

On the other hand, in the double-layer BD, the standards of the reflectance are from 4 to 8%. Therefore, in order to secure a sufficient reflectance, it is necessary that the transmittance of the L1 layer is increased as far as possible and that the reflectance of the L0 layer is increased as far as possible. As described previously, in the L1 layer including the phase change recording layer and the reflecting layer, there is a limit in securing a high reflectance, and the reflectance is generally from about 45% to 50%. In contrast, with respect to the reflectance of the L0 layer, when the reflectance is increased, the absorptance is lowered, and the recording sensitivity is lowered; however, by optimizing the layer construction, it is possible to compensate the recording sensitivity. On the other hand, a relationship between the reflectance in a crystalline state and a ratio between the reflectance in a crystalline state and the reflectance in an amorphous state (hereinafter referred to as "contrast") is shown in FIG. 20 by the calculation of multiple interference. The contrast is a value substantially equal to the BCA modulation degree. That is, it is demonstrated that when the reflectance is increased, the contrast or BCA modulation degree is lowered. For that reason, even in a higher reflectance, it is necessary to realize a recording layer material and a layer construction, from which a sufficiently high contrast is obtainable.

In consequence, it is desirable to provide an optical recording medium capable of making both high reflectance and high contrast compatible with each other and a method for manufacturing the same.

According to a first embodiment, there is provided an optical recording medium including:

a substrate, an information signal layer provided on the substrate and a protective layer provided on the information signal layer, wherein the information signal layer is provided with:

a reflecting layer, a recording layer provided on the reflecting layer and a first dielectric layer, a second dielectric layer and a third dielectric layer laminated successively on the recording layer;

refractive indexes of the first dielectric layer, the second dielectric layer and the third dielectric layer are different from each other between the adjacent dielectric layers to each other;

among the first dielectric layer, the second dielectric layer and the third dielectric layer, the dielectric layer having the highest refractive index contains, as a main component, at least one member selected from the group consisting of titanium oxide, niobium oxide and a mixture of zinc sulfide and silicon oxide; and the dielectric layer having the highest refractive index has a refractive index of 2.3 or more at a wavelength of 405 nm.

According to a second embodiment, there is provided a method for manufacturing an optical recording medium including the steps of:

forming an information signal layer on a substrate and forming a protective layer on the information signal layer, wherein the formation of an information signal layer includes successive lamination of a recording layer, a first dielectric layer, a second dielectric layer and a third dielectric layer on a substrate;

refractive indexes of the first dielectric layer, the second dielectric layer and the third dielectric layer are different from each other between the adjacent dielectric layers to each other;

among the first dielectric layer, the second dielectric layer and the third dielectric layer, the dielectric layer having the highest refractive index contains, as a main component, at least one member selected from the group consisting of titanium oxide, niobium oxide and a mixture of zinc sulfide and silicon oxide; and the dielectric layer having the highest refractive index has a refractive index of 2.3 or more at a wavelength of 405 nm.

According to a third embodiment, there is provided an optical recording medium including:

a substrate, an information signal layer provided on the substrate and a protective layer provided on the information signal layer, wherein the information signal layer is provided with:

a reflecting layer, a recording layer provided on the reflecting layer and a first dielectric layer, a second dielectric layer and a third dielectric layer laminated successively on the recording layer;

refractive indexes of the first dielectric layer, the second dielectric layer and the third dielectric layer are different from each other between the adjacent dielectric layers to each other; and among the first dielectric layer, the second dielectric layer and the third dielectric layer, the dielectric layer having the highest refractive index has a refractive index of 2.3 or more at a wavelength of 405 nm.

According to an embodiment, refractive indexes of the first dielectric layer, the second dielectric layer and the third dielectric layer are different from each other between the adjacent dielectric layers to each other. Also, the dielectric layer having the highest refractive index has a refractive index of 2.3 or more at a wavelength of 405 nm. In consequence, even in the case of enhancing the reflectance, it is possible to suppress a lowering in the contrast or BCA modulation degree.

As described previously, according to an embodiment, it is possible to make both high reflectance and high contrast compatible with each other Additional features and advantages are described herein, and will be apparent from the following Detailed Description and the figures.

BRIEF DESCRIPTION OF THE FIGURES

FIGS. 17A to 17C are each a graph showing a relationship between a contrast and a reflectance in Examples 15-1 to 16-2 and Comparative Example 3.

DETAILED DESCRIPTION

The present application will be explained in detail with reference to the accompanying drawings according to an embodiment.

(1) Embodiment 1 (an example in which a dielectric layer of a three-layer construction is provided on a recording layer of an L0 layer)

(2) Embodiment 2 (an example in which a barrier layer is provided between a reflecting layer and a dielectric layer of an L0 layer)

(1) Embodiment 1

(1-1) Construction of Optical Recording Medium

Figure 1:
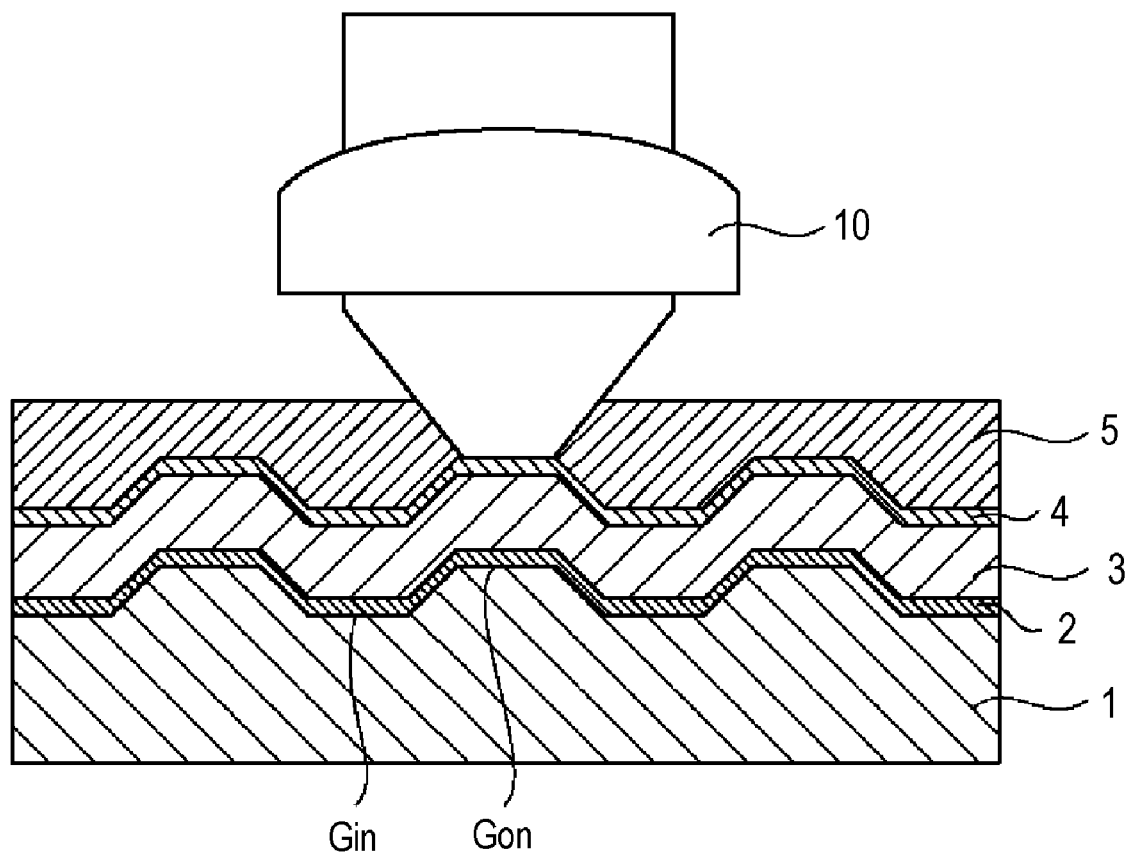
FIG. 1 is a diagrammatic sectional view showing an example of a construction of an optical recording medium according to Embodiment 1.

FIG. 1 shows an example of a construction of an optical recording medium according to Embodiment 1. This optical recording medium is a rewritable type optical recording medium capable of erasing or rewriting a data and as shown in FIG. 1, has a construction in which a first information signal layer (L0 layer) 2, an interlayer 3, a second information signal layer (L1 layer) 4 and a cover layer 5 are successively laminated on a substrate 1.

In this optical recording medium, recording or reproduction of an information signal is executed by irradiating a laser beam on the first information signal layer 2 or second information signal layer 4 from the side of the cover layer 5. For example, recording or reproduction of an information signal is executed by condensing a laser beam having a wavelength of from 400 nm to 410 nm by an objective lens 10 having a numerical aperture of from 0.84 to 0.86 and irradiating it on the first information signal layer 2 or second information signal layer 4 from the side of the cover layer 5. As such an optical recording medium, for example, BD-RE (Blu-ray Disk ReWritable) is exemplified.

Figure 2:
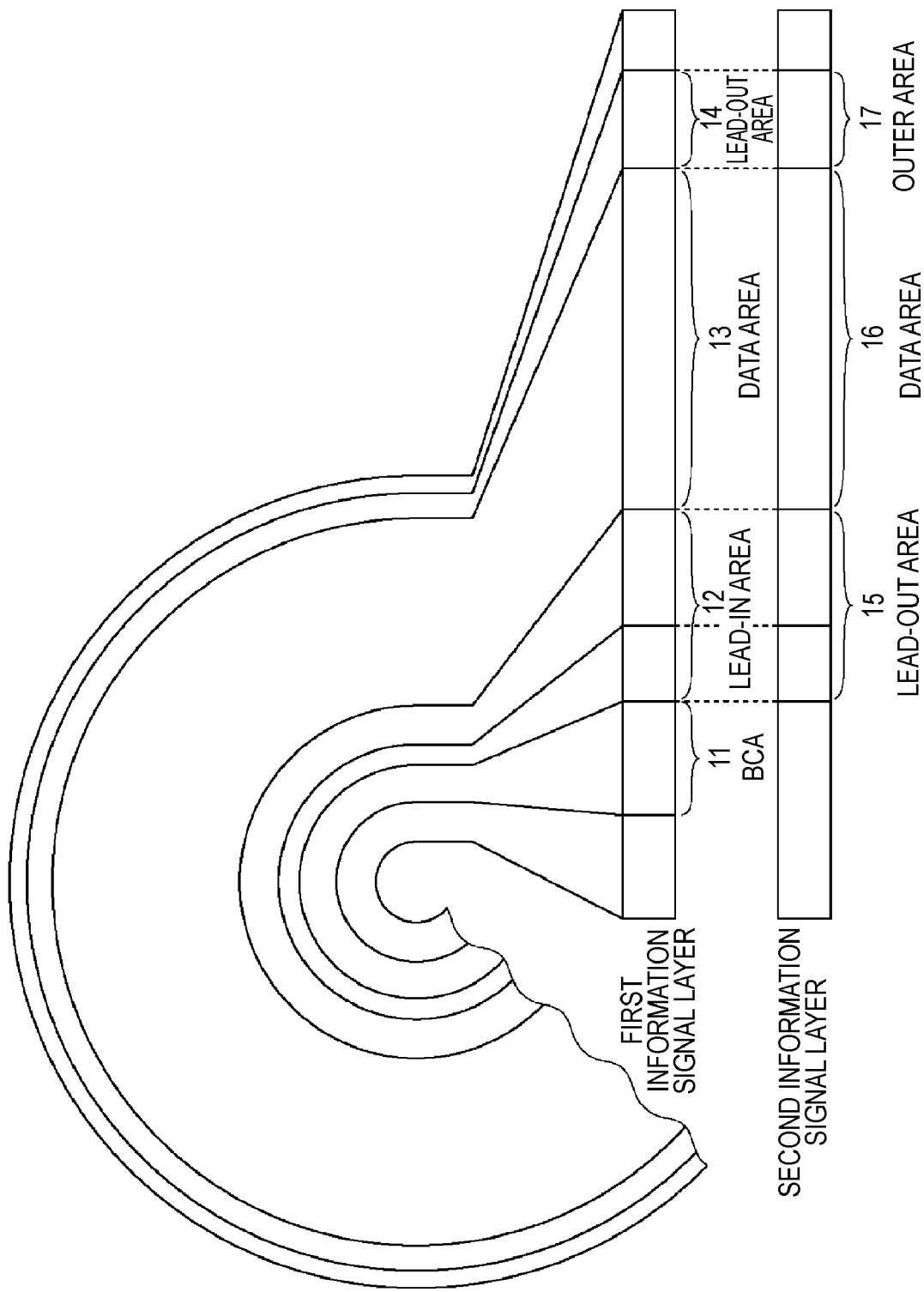
FIG. 2 is a diagrammatic view showing an example of a format of an optical recording medium according to Embodiment 1.

FIG. 2 shows an example of a format of an optical recording medium according to Embodiment 1n. As shown in FIG. 2, in the first information signal layer 2 of the optical recording medium, for example, a BCA 11, a lead-in area 12, a data area 13 and a lead-out area 14 are set toward the outer rim side from the center thereof. Also, in the second information signal layer 4, for example, a lead-out area 15, a data area 16 and an outer area 17 are set toward the outer rim side from the center thereof. The lead-in area 12 is, for example, further separated into a PIC (Permanent Information & Control Data) area, an OPI (Optimum Power Control) area and an INFO area.

The substrate 1, the first information signal layer 2, the interlayer 3, the second information signal layer 4 and the cover layer 5 constructing the optical recording medium are successively described below.

(Substrate)

The substrate 1 has a ring shape in which an opening is formed in a center thereof (this opening will be hereinafter referred to as "center hole"). One principal surface of this substrate 1 has a concave-convex surface, and the first information signal layer 2 is fabricated on this concave-convex surface. A concave and a convex of the concave-convex surface are hereunder called an in-groove Gin and an on-groove Gon, respectively.

As shapes of the in-groove Gin and the on-groove Gon, for example, various shapes such as a spiral shape, a concentric circle shape or the like are exemplified. For the purpose of adding address information, the in-groove Gin and/or the on-groove Gon is wobbled. In the BCA 11, from the viewpoint of satisfactorily reproducing a bar-code signal, the shape of the on-groove Gon is preferably in a V-shaped form.

For example, 120 mm is selected as a diameter of the substrate 1. A thickness of the substrate 1 is selected while taking into consideration its rigidity. The thickness of the substrate 1 is selected preferably from the range of 0.3 mm or more and not more than 1.3 mm, and more preferably from the range of 0.6 mm or more and not more than 1.3 mm. For example, 1.1 mm is selected. Also, for example, 15 mm is selected as a diameter of the center hole.

As a material of the substrate 1, a resin material such as a polycarbonate based resin, a polyolefin based resin, an acrylic resin or the like, or glass can be used. Taking into consideration costs and the like, it is preferable to use a resin material. As the resin material, for example, ZEONEX or polycarbonate (PC) (refractive index: 1.59) can be specifically used.

As a molding method of the substrate 1, any method may be adopted without particular limitations so far as a desired shape and optically sufficient smoothness of the substrate surface are obtainable. For example, an injection molding method (injection method) or a photopolymerization method (2P method) using an ultraviolet ray-curable resin can be adopted. In the injection molding method, the substrate 1 is prepared by arranging a prepared mother stamper within a die cavity for preparing a disc substrate, injecting a transparent resin such as polycarbonate or the like into the cavity and then transferring a concave-convex shape of the mother stamper onto the resin.

(First Information Signal Layer and Second Information Signal Layer)

Figure 3:
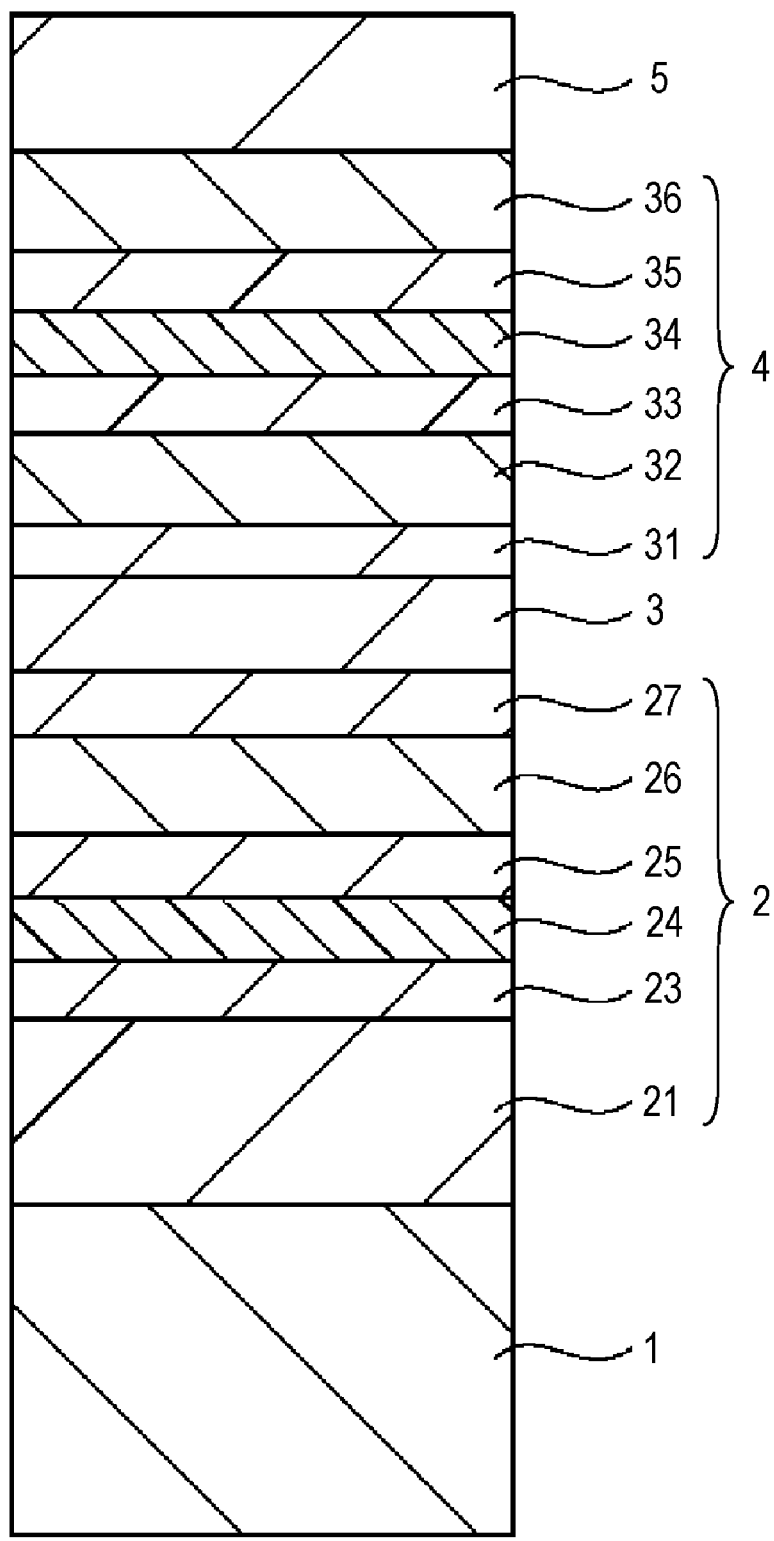
FIG. 3 is a diagrammatic sectional view showing a construction example of a first information signal layer and a second information signal layer of an optical recording medium according to Embodiment 1.

FIG. 3 shows a construction example of a first information signal layer and a second information signal layer of an optical recording medium according to Embodiment 1 of the present invention. As shown in FIG. 3, the first information signal layer 2 is a laminated film in which a reflecting layer 21, a dielectric layer 23, a recording layer 24, a first dielectric layer 25, a second dielectric layer 26 and a third dielectric layer 27 are successively laminated on the substrate 1.

As a material constructing the reflecting layer 21, for example, materials made of, as a main component, a simple substance such as Al, Ag, Au, Ni, Cr, Ti, Pd, Co, Si, Ta, W, Mo, Ge or the like, or an alloy thereof, can be exemplified. Of these, Al based, Ag based, Au based, Si based or Ge based materials are especially preferable from the viewpoint of practicality. As the alloy, for example, Al—Ti, Al—Cr, Al—Cu, Al—Mg—Si, Ag—Pd—Cu, Ag—Pd—Ti, Si—B or the like is suitably useful. It is preferable to set up one of these materials while taking into consideration optical characteristics and thermal characteristics. For example, taking into consideration a point of having a high reflectance even in a short wavelength region, it is preferable to use an Al based or Ag based material. As a material constructing the dielectric layer 23, for example, SiN, ZnS—SiO$_2$, AlN, Al$_2$O$_3$, a complex oxide made of SiO$_2$—Cr$_2$O$_3$—ZrO$_2$ (hereinafter referred to as "SCZ"), a complex oxide made of SiO$_2$—In$_2$O$_3$—ZrO$_2$ (hereinafter referred to as "SIZ"), TiO$_2$ or Nb$_2$O$_5$ is useful.

As a material constructing the recording layer 24, for example, a material containing, as a main component, a phase change material in which a reversible state is caused by receiving the irradiation with a laser beam is useful. As such a phase change material, for example, a eutectic system phase change material or a compound system phase change material in which a reversible phase change between the amorphous state and the crystalline state is caused is useful. From the viewpoints of reflectance and crystallization rate, it is preferable to use a eutectic system phase change material.

As the eutectic system phase change material, for example, an SbTe based eutectic system material is useful. As the SbTe based eutectic system material, a eutectic system material neighboring to a eutectic composition of Sb$_{70}$Te$_{30}$ is useful. Also, for the purpose of enhancing the storage durability, adjusting the crystallization rate, enhancing the modulation degree or the like, it is preferable to add an additive element such as Ag, In, Ge or the like. Examples thereof include systems containing Sb—Te, Ge—Sb—Te, In—Sb—Te, Ag—In—Sb—Te, Au—In—Sb—Te, Ge—Sb—Te—Pd, Ge—Sb—Te—Se, Ge—Sb—Te—Bi, Ge—Sb—Te—Co or Ge—Sb—Te—Au; systems obtained by introducing a gas additive such as nitrogen, oxygen or the like into such a system; and the like.

Refractive indexes of the first dielectric layer 25, the second dielectric layer 26 and the third dielectric layer 27 are different from each other between the adjacent dielectric layers to each other. Of the first dielectric layer 25, the second dielectric layer 26 and the third dielectric layer 27, the dielectric layer having the highest refractive index contains, as a main component, at least one member selected from the group consisting of TiO$_2$ (titanium oxide), Nb$_2$O$_5$ (niobium oxide) and ZnS—SiO$_2$ (a mixture of zinc sulfide and silicon oxide). A refractive index of the dielectric layer having the highest refractive index is 2.3 or more, and preferably 2.3 or more and not more than 2.65 at a wavelength of 405 nm. By taking such a construction, it is possible to make both high reflectance and high contrast compatible with other.

From the viewpoint of storage reliability, as a material of the first dielectric layer 25 adjacent to the recording layer 24, ZnS—SiO$_2$ is preferable. As this ZnS—SiO$_2$, one having a content of zinc sulfide of 70 atomic % or more and not more than 90 atomic % and a content of silicon oxide of 10 atomic % or more and not more than 30 atomic % is preferable. Specifically, for example, as ZnS—SiO$_2$, one having a content of zinc sulfide of about 80 atomic % and a content of silicon oxide of about 20 atomic % is preferable.

When refractive indexes of the first dielectric layer 25, the second dielectric layer 26 and the third dielectric layer 27 are defined as $n_1$, $n_2$ and $n_3$, respectively, for example, the refractive indexes $n_1$, $n_2$ and $n_3$ are satisfied with a relationship of $n_1 > n_2 > n_3$, or a relationship of $n_2 > n_1$ and $n_2 > n_3$. From the viewpoint of further enhancing high reflectance and high contrast, it is preferable that the refractive indexes $n_1$, $n_2$ and $n_3$ are satisfied with a relationship of $n_1 > n_2 > n_3$. More specifically, the relationship of $n_2 > n_1$ and $n_2 > n_3$ is preferably a relationship of $n_2 > n_1 > n_3$. Also, from the viewpoint of recording characteristics, as a material of the first dielectric layer 25 adjacent to the recording layer 24, it is preferable to use a material containing, as a main component, SiN, ZnS—SiO$_2$, AlN, Al$_2$O$_3$, SiO$_2$, SCZ or SIZ.

As materials of the two dielectric layers other than the dielectric layer having the highest refractive index, for example, a material containing, as a main component, SiN, ZnS—SiO$_2$, AlN, Al$_2$O$_3$, SiO$_2$, SCZ or SIZ is useful.

The laminated film of the first dielectric layer 25, the second dielectric layer 26 and the third dielectric layer 27 is a laminated film obtained by laminating three layers of at least two kinds of layers of a low refractive index layer (hereinafter properly referred to as "L layer"), a middle refractive index layer (hereinafter properly referred to as "M layer") and a high refractive index layer (hereinafter properly referred to as "H layer"). Specifically, for example, a laminated film obtained by laminating three layers of three kinds of layers of an L layer, an M layer and an H layer; a laminated film obtained by laminating three layers of two kinds of layers of an L layer and an M layer; and a laminated film obtained by laminating three layers of two kinds of layers of an L layer and an H layer can be exemplified. In this three-layer laminated film, the adjacent refractive index layers to each other are refractive index layers of a different kind from each other.

As a combination of the laminated film, for example, a combination of L layer-H layer-M layer, a combination of H layer-L-layer-M layer, a combination of L layer-M layer-L layer, a combination of L layer-M layer-H layer, a combination of M layer-H layer-L layer, a combination of M layer-L layer-H layer, a combination of M layer-L layer-M layer, a combination of L layer-M layer-L layer or the like is exemplified. From the viewpoint of further enhancing high reflectance and high contrast, a combination of L layer-M layer-H layer is preferable. The foregoing expression "L layer-M layer-H layer" means a lamination order of an H layer, an M layer and an L layer toward the interlayer 3 from the recording layer 24. That is, it is meant by the foregoing expression "L layer-M layer-H layer" that the H layer is a layer adjacent to the recording layer 24 and that the L layer is a layer adjacent to the interlayer 3. The foregoing expressions other than the expression "L layer-M layer-H layer" mean the same contents as described above.

The "L layer" as referred to herein means a layer having the lowest refractive index among the L layer, the M layer and the H layer, and its refractive index is less than 2.30, and preferably 1.96 or more and less than 2.30. The "H layer" as referred to herein means a layer the highest refractive index among the L layer, the M layer and the H layer, and its refractive index is 2.55 or more, and preferably 2.55 or more and not more than 2.65. The "M layer" as referred to herein means a layer having a refractive index positioning between the refractive index of the L Layer and the refractive index of the H layer, and its refractive index is 2.30 or more and less than 2.55. The foregoing refractive indexes are those at a wavelength of 405 nm.

As shown in FIG. 3, the second information signal layer 4 is a laminated film in which a reflecting layer 31, a second dielectric layer 32, a first dielectric layer 33, a recording layer 34, a first dielectric layer 35 and a second dielectric layer 36 are successively laminated on the interlayer 3.

As a material constructing the reflecting layer 31, for example, materials made of, as a main component, a simple substance such as Al, Ag, Au, Ni, Cr, Ti, Pd, Co, Si, Ta, W, Mo, Ge or the like, or an alloy thereof, can be exemplified. Of these, Al based, Ag based, Au based, Si based or Ge based materials are especially preferable from the viewpoint of practicality. As the alloy, for example, Al—Ti, Al—Cr, Al—Cu, Al—Mg—Si, Ag—Pd—Cu, Ag—Pd—Ti, Si—B or the like is suitably useful. It is preferable to set up one of these materials while taking into consideration optical characteristics and thermal characteristics. For example, taking into consideration a point of having a high reflectance even in a short wavelength region, it is preferable to use an Al based or Ag based material.

As a material of each of the second dielectric layer 32 and the second dielectric layer 36, for example, a material containing, as a main component, SiN, ZnS—$SiO_2$, AlN, $Al_2O_3$, SCZ, $TiO_2$ or $Nb_2O_5$ is useful, with ZnS—$SiO_2$ being preferable for the use. Also, as a material of each of the first dielectric layer 33 and the first dielectric layer 35, for example, a material containing, as a main component, SiN, ZnS—$SiO_2$, $Al_2O_3$, SCZ, SIZ, $TiO_2$ or $Nb_2O_5$ is useful, with SiN being preferable for the use.

(Interlayer)

The interlayer 3 is formed as a resin layer having a thickness of, for example, 25 μn is formed on the first information signal layer 2 formed on the substrate 1. This interlayer 3 is made of a transparent resin material. As such a material, for example, a plastic material such as a polycarbonate based resin, a polyolefin based resin, an acrylic resin or the like is useful. Similar to the substrate 1, the surface of the interlayer 3, which serves as the side of the cover layer 5, is a concave-convex surface which is constructed by an in-groove Gin and an on-groove Gon. The second information signal layer 4 is fabricated on this concave-convex surface.

For example, the interlayer 3 is formed by pressing a transparent resin stamper against an ultraviolet ray-curable resin which is flat coated on the first information signal layer 2 under a vacuum environment, transferring concaves and convexes of this stamper onto the ultraviolet ray-curable resin and then irradiating ultraviolet rays on the ultraviolet ray-curable resin, thereby curing the ultraviolet ray-curable resin. Similar to the foregoing substrate 1, one principal surface of this interlayer 3 has a concave-convex surface. The second information signal layer 4 is fabricated on this concave-convex surface. A concave and a convex of the concave-convex surface of the interlayer 3 are hereunder called an in-groove Gin and an on-groove Gon, respectively.

As shapes of the concave in-groove Gin and the convex on-groove Gon, for example, various shapes such as a spiral shape, a concentric circle shape or the like are exemplified. Also, in order to add address information, the in-groove Gin and/or the on-groove Gon is wobbled.

(Cover Layer)

For example, the cover layer 5 is constructed by a light transmitting sheet having a ring shape and an adhesive layer for sticking this light transmitting sheet to the substrate 1. It is preferable that the light transmitting sheet is made of a material having a low absorptive power to a laser beam used for the recording and/or reproduction, and specifically, it is preferable that the light transmitting sheet is made of a material having a transmittance of 90% or more. As a material of the light transmitting sheet, for example, a polycarbonate resin material or a polyolefin based resin (for example, ZEONEX (a registered trademark)) is exemplified. A thickness of the light transmitting sheet is preferably selected within the range of not more than 0.3 mm, and more preferably selected within the range of from 3 μm to 177 μm. The adhesive layer is made of, for example, an ultraviolet ray-curable resin or a pressure sensitive adhesive (PSA). Also, the cover layer 5 may be constructed by a resin cover obtained by curing a photosensitive resin such as a UV resin or the like. As a material of the resin cover, for example, an ultraviolet ray-curable acrylic resin is exemplified.

A thickness of the cover layer 5 is preferably selected within the range of from 10 μm to 177 μm. For example, 100 μm is selected. Such a thin cover layer 5 is able to realize high-density recording upon being combined with an objective lens having a high numerical aperture of, for example, about 0.85.

(Each Area of Optical Recording Medium)

The BCA 11, the lead-in area 12 and the data area 13 provided in the optical recording medium according to Embodiment 1 are hereunder described.

Figure 4:
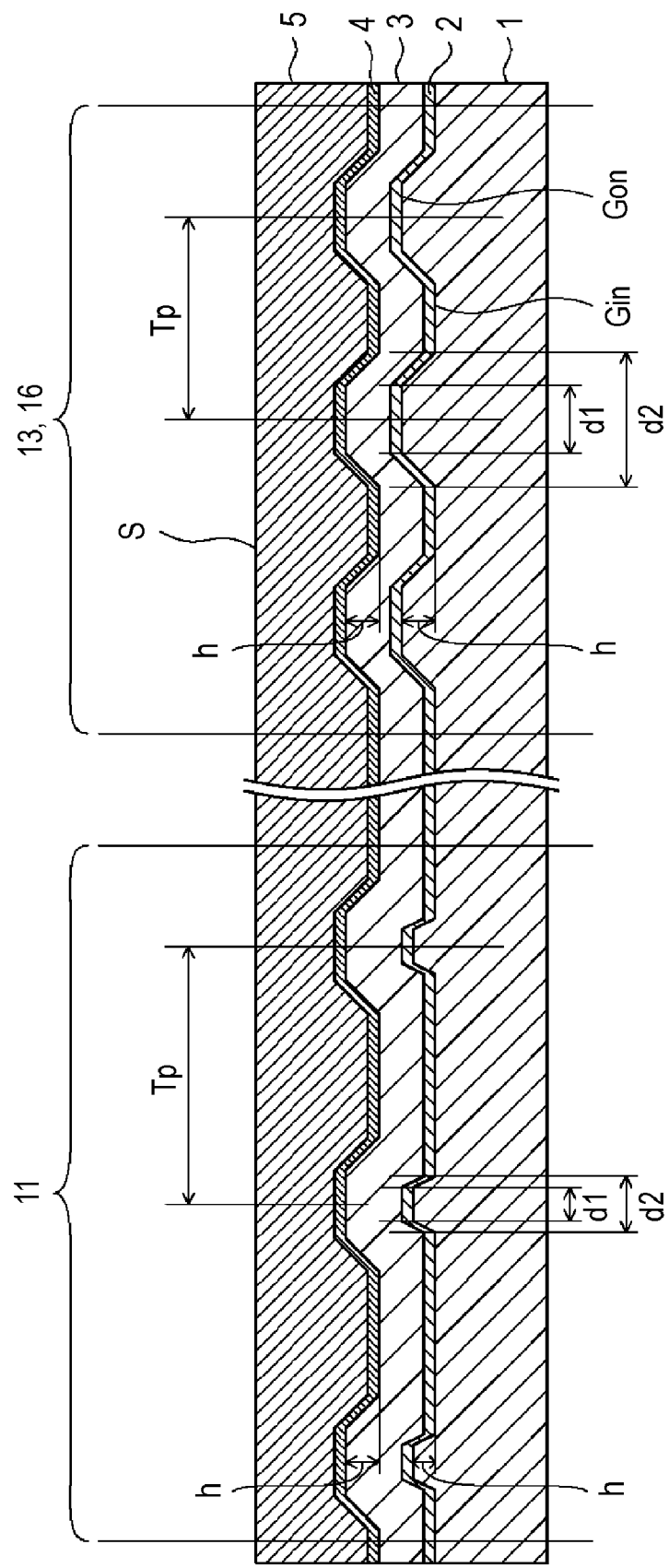
FIG. 4 is a diagrammatic sectional view conceptually showing an example of an arrangement of grooves of an information signal layer of an optical recording medium according to Embodiment 1.
Figure 5:
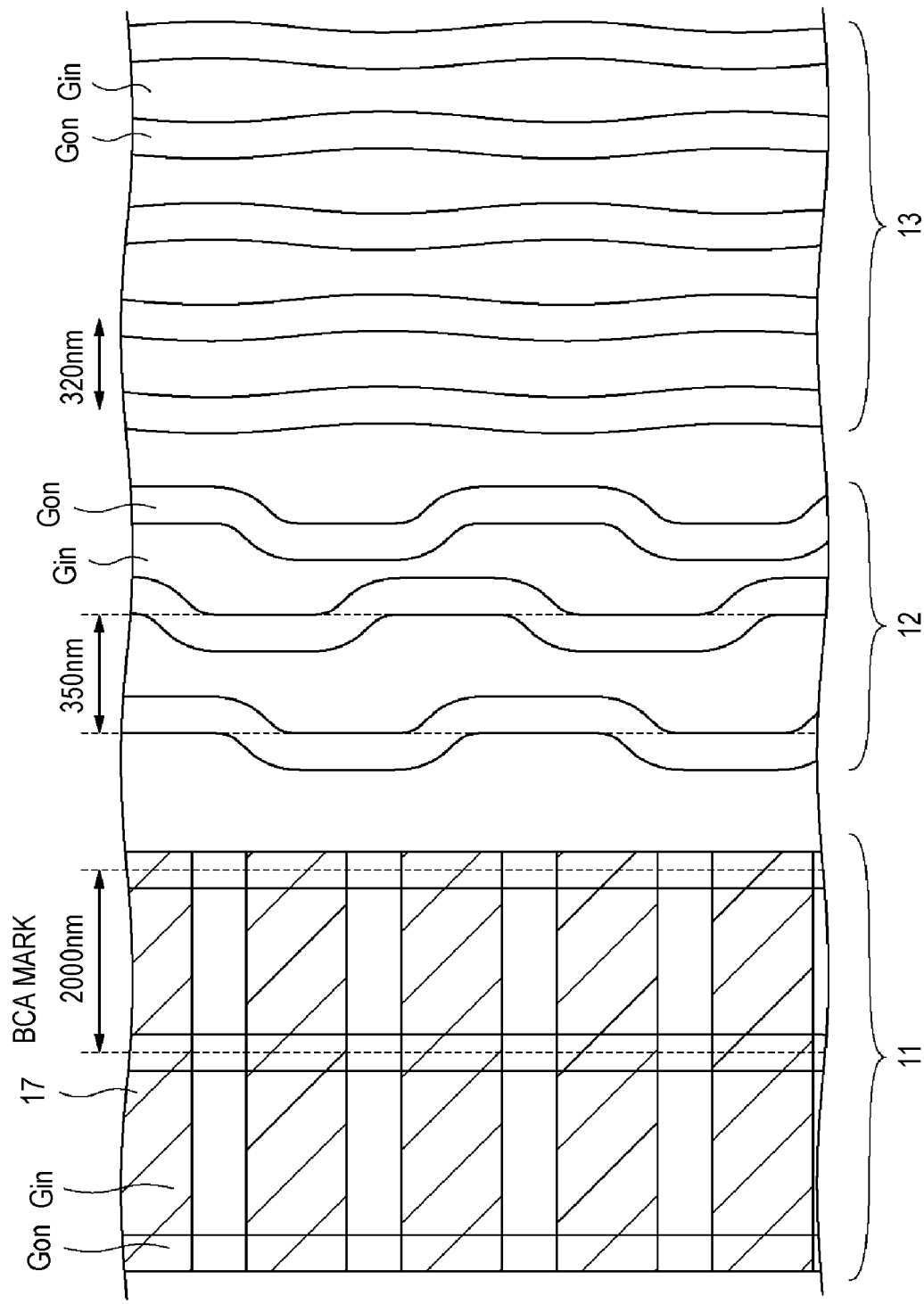
FIG. 5 is a diagrammatic plan view conceptually showing an example of an arrangement of grooves of an information signal layer of an optical recording medium according to Embodiment 1.

Each of FIGS. 4 and 5 conceptually shows an example of an arrangement of grooves of the information signal layer 2 of the optical recording medium according to Embodiment 1. Here, the case where the on-groove Gon becomes a track for recording a data is described. Also, in FIG. 5, for the purpose of making the illustration easy, it is assumed that a width of the on-groove Gon provided in the BCA 11 and a width of the on-groove Gon provided in each of the lead-in area 12 and the data area 13 are substantially equal to each other. However, a width d of the on-groove Gon provided in the BCA 11 may be narrower than a width d of the on-groove Gon provided in each of the lead-in area 12 and the data area 13.

A layout of grooves of a track pitch of, for example, 2,000 nm is formed in the BCA 11 on the innermost rim side. A layout of wobble grooves of a track pitch of, for example, 350 nm is formed in the lead-in area 12 on the outside of the BCA 11. Wobble grooves of a track pitch of, for example, 320 nm are formed in the data area 13 on the further outside of the lead-in area 12. The grooves formed in each of these areas are formed on the substrate surface so as to run in one spiral shape. A track pitch transition area (not shown) for switching the track pitch is arranged between areas where the track pitch changes.

The BCA 11 is provided in an area of a radius r of, for example, from 21.3 mm to 22.0 mm, and groove-shaped tracks are formed in the BCA 11. The track pitch is, for example, 2,000 nm, and a sufficiently wide interval is assured. For example, a BCA mark 17 is recorded in the BCA 11. This BCA mark 17 preferably has a rectangular shape. The BCA mark 17 is a data in which binary information, for example, a serial number, a lot number or the like is converted into a bar code and is utilized as information inherent to the optical recording medium for the purpose of protecting the copyright. The BCA mark 17 is one in which a rectangular mark extending in the radial direction so as to traverse plural grooves of the BCA 11 is formed, for example, over one circumference.

The BCA mark 17 is recorded after preparing the optical recording medium. In the initial state of the optical recording medium, the information signal layer is in an unrecorded state. A laser beam is irradiated only on a desired portion (hatched areas in FIG. 5) in correspondence to the BCA mark 17, thereby converting the information signal layer into a recorded state. As a result of such a processing step, in the BCA 11 of the information signal layer 2, information is recorded in a bar-code form by a pattern constructed by a bar portion in a recorded state with a desired width along the circumferential direction and a bar portion in an unrecorded state.

The lead-in area 12 is a read only area and is provided in an area of a radius r of, for example, from 22.4 mm to 23.197 mm. For example, groove tracks each constructed by a layout of rectangular wobble grooves are formed in the lead-in area 12 at a track pitch of, for example, 350 nm. The information is reproduced from the layout of the rectangular wobble grooves.

The data area 13 is provided in an area of a radius r of, for example, from 23.2 mm to 58.5 mm, and sine-wave wobble grooves are formed in the data area 13. The track pitch is, for example, 320 nm. This is because by narrowing the track pitch, a large capacity by which recording or reproduction can be executed for a longer time is obtained.

In the BCA 11, it is preferable that the width d of the on-groove Gon is narrower than the width d of the on-groove Gon of the data area 13. Also, it is preferable that a depth (height) h of the on-groove Gon of the BCA 11 is shallower (lower) than a depth (height) h of the on-groove Gon of the data area 13. In the BCA 11 and the data area 13, a distance between the adjacent on-grooves Gon to each other, namely a track pitch Tp is different. It is preferable that a track pitch Tp of the BCA 11 is wider than a track pitch Tp of the data area 13. According to this, such a situation that the BCA signal is modulated by diffraction by the on-groove Gon can be reduced. That is, level fluctuation in the reproduction signal of the BCA mark can be reduced. In other words, a contrast 1H/1L can be enhanced.

In the BCA 11, a phase depth Van of the on-groove Gon is preferably in the range of from $\lambda/296.8n$ to $\lambda/16.0n$, and more preferably in the range of from $\lambda/296.8n$ to $\lambda/63.6n$. This is because by making the phase depth $\lambda/\alpha n$ of the on-groove Gon fall within the foregoing range, the contrast 1H/1L can be enhanced. Here, $\lambda$ represents a wavelength of the recording or reproducing laser beam; $\alpha$ represents a coefficient of the groove depth; and n represents a refractive index of the cover layer relative to the recording or reproducing laser beam.

In the BCA 11, a depth h of the on-groove Gon is preferably in the range of from 0.9 nm to 16.7 nm, and more preferably in the range of from 0.9 nm to 4.2 nm. This is because by making the depth h of the on-groove Gon fall within the foregoing range, the contrast 1H/1L can be enhanced.

In the BCA 11, the width d of the on-groove Gon is preferably in the range of from 55 nm to 126 nm, and more preferably in the range of from 55 nm to 95 nm. This is because by making the width d of the on-groove Gon fall within the foregoing range, the contrast 1H/1L can be enhanced.

In the BCA 11, a ratio (d/Tp) of the width d of the on-groove Gon to the track pitch Tp is preferably in the range of from 0.0275 to 0.063, and more preferably in the range of from 0.0275 to 0.0475. This is because by making the ratio d/Tp fall within the foregoing range, the contrast 1H/1L can be enhanced. Here, the width d of the on-groove Gon is an average value $(d1_{max}+d2_{min})$ of its maximum width $d1_{max}$ and its minimum width $d2_{min}$. Here, the maximum width $d1_{max}$ represents a maximum width of widths d1 of the on-grooves Gon on the side of the laser beam incident surface S; and the minimum width $d2_{min}$ represents a minimum width of widths d2 of the on-grooves Gon on the bottom side opposite to the laser beam incident surface S.

(1-2) Manufacturing Method of Optical Recording Medium

Next, an example of the manufacturing method of an optical recording medium having the foregoing construction is described.

First of all, the substrate 1 is molded by, for example, an injection molding method, a photopolymerization method (2P method) or the like.

Subsequently, the reflecting layer 21, the dielectric layer 23, the recording layer 24, the first dielectric layer 25, the second dielectric layer 26 and the third dielectric layer 27 are successively laminated on the substrate 1 by, for example, a sputtering method. According to this, the first information signal layer 2 is formed on the substrate 1.

Subsequently, an ultraviolet ray-curable resin is uniformly coated on the first information signal layer 2 by, for example, a spin coating method. Thereafter, a concave-convex pattern of a stamper is pressed against the ultraviolet ray-curable resin which has been uniformly coated on the substrate 1; ultraviolet rays are irradiated on the ultraviolet ray-curable resin, thereby curing the ultraviolet ray-curable resin; and thereafter, the stamper is separated. According to this, the concave-convex pattern of the stamper is transferred onto the ultraviolet ray-curable resin, thereby forming the interlayer 3 having an in-groove Gin and an on-groove Gon provided therein.

Subsequently, the reflecting layer 31, the second dielectric layer 32, the first dielectric layer 33, the recording layer 34, the first dielectric layer 35 and the second dielectric layer 36 are successively laminated on the interlayer 3 by, for example, a sputtering method. According to this, the second information signal layer 4 is formed on the interlayer 3.

Subsequently, the cover layer 5 is formed on the second information signal layer 4. As a method for forming the cover layer 5, for example, a resin coating method in which a photosensitive resin such as a UV resin or the like is spin coated on the second information signal layer 4, and light such as UV light or the like is irradiated on the photosensitive layer, thereby forming the cover layer 5 can be adopted. Also, a sheet adhesion method in which a light transmitting sheet is stuck on the side of the concave-convex surface on the substrate 1 by using an adhesive, thereby forming the cover layer 5 can be adopted. As this sheet adhesion method, for example, a sheet adhesion method in which a light transmitting sheet is stuck on the side of the concave-convex surface on the substrate 1 by using the photosensitive resin such as a UV resin or the like, which has been coated on the second information signal layer 4, thereby forming the cover layer 5 can be adopted. Also, as the sheet adhesion method, a sheet PSA adhesion method in which a light transmitting sheet is stuck on the side of the concave-convex surface on the substrate 1 by using a pressure sensitive adhesive (PSA) which has been previously uniformly coated on one principal surface of this sheet, thereby forming the cover layer 5 can be adopted.

According to the foregoing processing step, the optical recording medium shown in FIG. 1 is obtained.

As described previously, according to Embodiment 1, the first dielectric layer 25, the second dielectric layer 26 and the third dielectric layer 27 are successively laminated on the recording layer 24. Refractive indexes of the first dielectric layer 25, the second dielectric layer 26 and the third dielectric layer 27 are different from each other between the adjacent dielectric layers to each other. Among the first dielectric layer 25, the second dielectric layer 26 and the third dielectric layer 27, the dielectric layer having the highest refractive index contains, as a main component, at least one member selected from the group consisting of titanium oxide, niobium oxide and a mixture of zinc sulfide and silicon oxide. A refractive index of the dielectric layer having the highest refractive index is 2.3 or more. According to this, it is possible to make both high refractive index and high contrast compatible with each other.

(2) Embodiment 2

Figure 6:
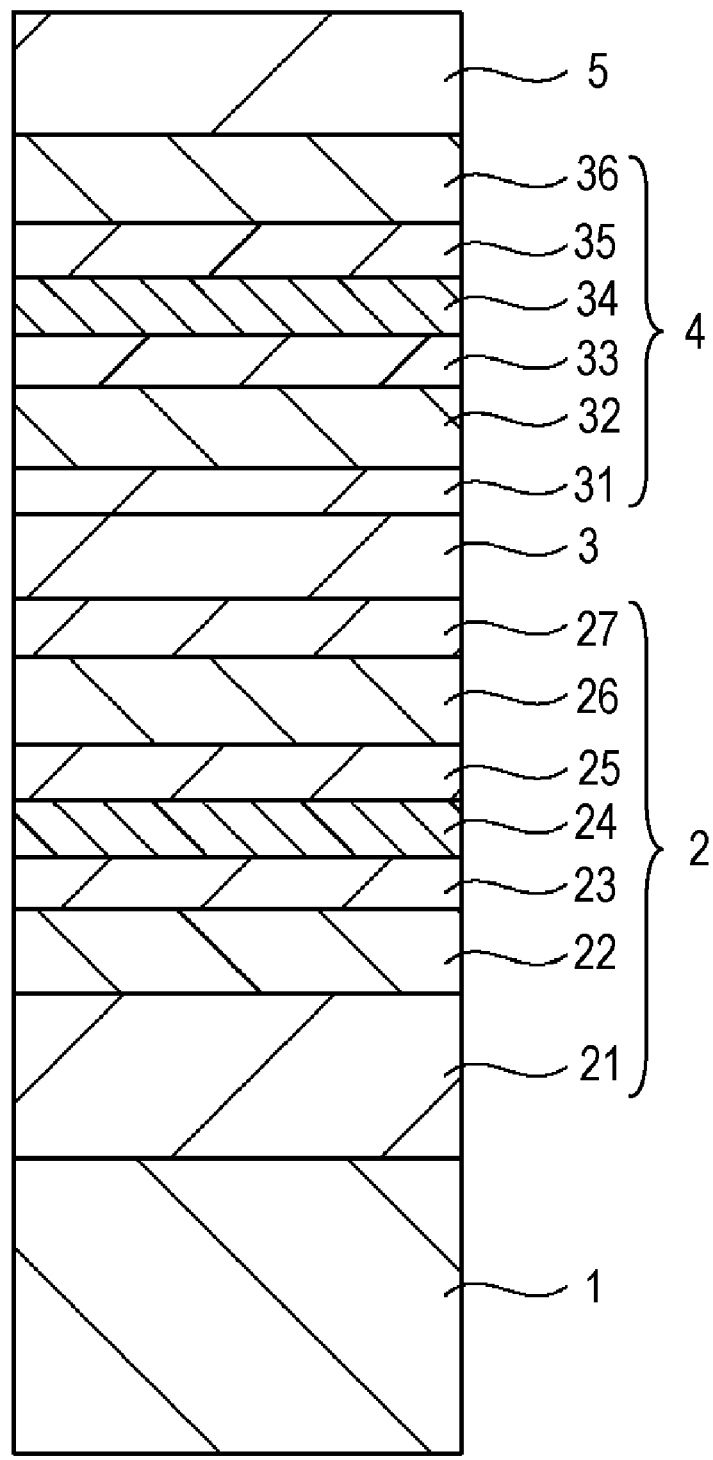
FIG. 6 is a diagrammatic sectional view showing an example of a construction of an optical recording medium according to Embodiment 2.

FIG. 6 shows a construction example of a first information signal layer and a second information signal layer of an optical recording medium according to Embodiment 2. As shown in FIG. 6, the optical recording medium according to this Embodiment 2 is different from that according to Embodiment 1 in a point that a barrier layer 22 is provided between the reflecting layer 21 and the dielectric layer 23 of the first information signal layer 2.

The barrier layer 22 is a layer for preventing a reaction between the material contained in the reflecting layer 21 and the material contained in the dielectric layer 23 from occurring. For example, in the case where the reflecting layer 21 contains Ag, and the dielectric layer 23 contains S, the reaction between Ag and S and the corrosion of Ag can be prevented from occurring. As a material of the barrier layer 22, for example, a material containing, as a main component, a dielectric such as $Si_3N_4$, $SiO_2$, $Cr_2O_3$, $In_2O_3$, $ZrO_2$ or the like can be used.

According to Embodiment 2, since the barrier layer 22 is provided between the reflecting layer 21 and the dielectric layer 23 of the first information signal layer 2, it is possible to prevent a reaction between the material contained in the reflecting layer 21 and the material contained in the dielectric layer 23 from occurring. In consequence, satisfactory signal characteristics and high reliability can be obtained.

EXAMPLES

Embodiments according to an embodiment are specifically described below with reference to the following Examples, but it should not be construed that embodiments according to the present invention are limited to these Examples. In the following Examples, portions corresponding to those of the foregoing Embodiments 1 and 2 are given the same symbols, respectively.

In order to verify the effects of embodiments according to the present invention, the refractive index and the BCA modulation degree of the first information signal layer (L0 layer) were evaluated by changing the layer construction and the materials. As an evaluation sample, one prepared by fabricating a first information signal layer (L0 layer) 2 on a substrate 1 having a thickness of 1.1 mm by sputtering, forming a cover layer 5 on this first information signal layer (L0 layer) 2 and then initializing the first information signal layer (L0 layer) 2.

Figure 7:
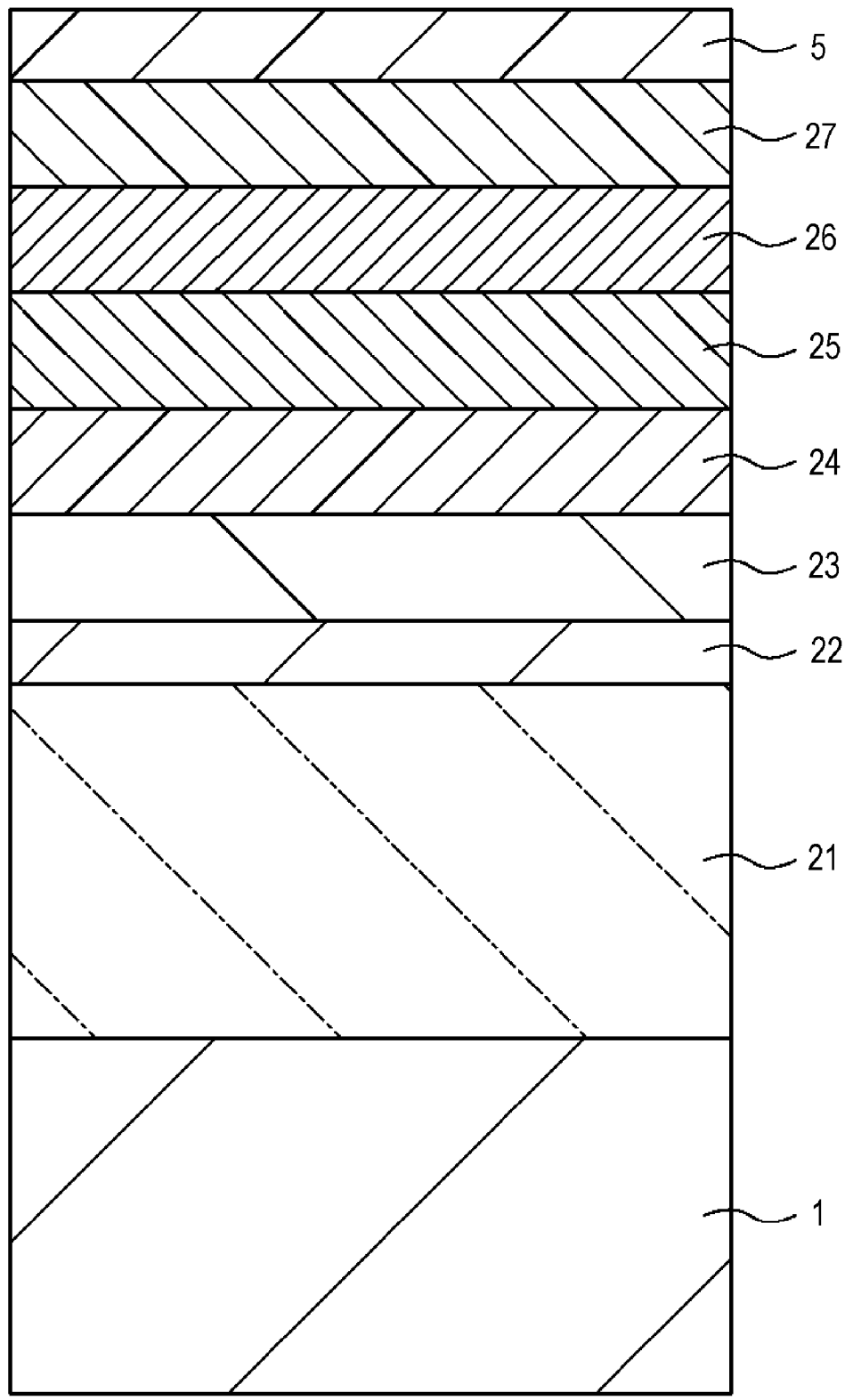
FIG. 7 is a diagrammatic sectional view showing an example of a construction of an optical recording medium according to the working examples.

That is, as shown in FIG. 7, the evaluation sample has a medium structure in which an interlayer 3 and a second information signal layer (L1 layer) 4 are not provided. However, since the BCA modulation degree which is a ratio between the reflectance in a crystalline state and the reflectance in an amorphous state does not rely upon the medium structure, a sample was prepared and evaluated for the BCA modulation degree by the foregoing techniques.

The Examples and Comparative Examples are hereunder described with reference to FIG. 7.

Example 1

First of all, a reflecting layer 21, a barrier layer 22, a dielectric layer 23, a recording layer 24, a first dielectric layer 25, a second dielectric layer 26 and a third dielectric layer 27 were successively laminated on a polycarbonate substrate 1 having a thickness of 1.1 mm by a sputtering method. According to this, a first information signal layer 2 was formed on the substrate 1. Subsequently, a polycarbonate sheet having a ring shape was stuck onto the substrate 1 by using a pressure sensitive adhesive (PSA) which had been previously uniformly coated on one principal surface of this sheet, thereby forming a cover layer 5 having a thickness of 0.1 mm on the first information signal layer 2. Subsequently, the first information signal layer 2 was initialized by irradiating a red laser beam on the first information signal layer 2 from the side of the cover layer 5.

There was thus obtained a desired optical recording medium.

The material and the film thickness of each of the films of the first information signal layer 2 are shown below.

Three kinds of samples were prepared by changing the thickness of the third dielectric layer 27 as shown below.
Reflecting Layer
Material: Ag alloy, film thickness: 100 nm
Barrier Layer
Material: $Si_3N_4$, film thickness: 10 nm
Dielectric Layer
Material: $(ZnS)_{80}(SiO_2)_{20}$, film thickness: 12 nm
Recording Layer
Material: $Ge_{5.5}Sb_{75.6}Te_{18.9}$, film thickness: 11 nm
First Dielectric Layer
Material: $Si_3N_4$, film thickness: 10 nm
Second Dielectric Layer
Material: $(ZnS)_{80}(SiO_2)_{20}$, film thickness: 32 nm
Third Dielectric Layer
Material: $Si_3N_4$, film thickness: 10 nm, 13 nm, 15 nm The reason why the dielectric layers on the top and bottom of the recording layer 24 are formed of $(ZnS)_{80}(SiO_2)_{20}$ resides in the fact that since the subject material has a very low heat conductivity, sufficient recording sensitivity can be imparted to the optical recording medium. Also, the reason why the sample is prepared by changing the film thickness of the third dielectric layer 27 on three levels resides in the fact that in the case of changing the reflectance, a tendency of the reflectance and the BCA modulation degree is examined.

Example 2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{50}(SiO_2)_{50}$, film thickness: 10 nm
Second Dielectric Layer
Material: $(ZnS)_{80}(SiO_2)_{20}$, film thickness: 5 nm
Third Dielectric Layer
Material: SiN, film thickness: 45 nm, 47 nm, 49 nm Example 3

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{50}(SiO_2)_{50}$, film thickness: 5 nm
Second Dielectric Layer
Material: $(ZnS)_{80}(SiO_2)_{20}$, film thickness: 10 nm
Third Dielectric Layer
Material: SiN, film thickness: 48 nm, 50 nm, 52 nm Example 4

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{50}(SiO_2)_{50}$, film thickness: 5 nm
Second Dielectric Layer
Material: $(ZnS)_{80}(SiO_2)_{20}$, film thickness: 5 nm
Third Dielectric Layer
Material: SiN, film thickness: 48 nm, 50 nm, 52 nm Example 5

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 15 nm
Second Dielectric Layer
Material: $TiO_2$, film thickness: 6 nm
Third Dielectric Layer
Material: SiN, film thickness: 37 nm, 40 nm, 43 nm Example 6

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 15 nm
Second Dielectric Layer
Material: $TiO_2$, film thickness: 12 nm
Third Dielectric Layer
Material: SiN, film thickness: 15 nm, 18 nm, 21 nm Example 7

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 15 nm
Second Dielectric Layer
Material: $Nb_2O_5$, film thickness: 8 nm
Third Dielectric Layer
Material: SiN, film thickness: 37 nm, 40 nm, 43 nm Example 8

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 15 nm
Second Dielectric Layer
Material: $Nb_2O_5$, film thickness: 12 nm
Third Dielectric Layer
Material: SiN, film thickness: 12 nm, 15 nm, 18 nm Comparative Example 1

The first information signal layer 2 was formed by the reflecting layer 21, the barrier layer 22, the dielectric layer 23, the recording layer 24, the first dielectric layer 25 and the third dielectric layer 27. An optical recording medium was obtained in the same manner as in Example 1, except that the material and the film thickness of each of these films constructing such a first information signal layer 2 were changed as follows.
 Reflecting Layer
  Material: Ag alloy, film thickness: 100 nm
 Barrier Layer
  Material: $(SiO_2)_{35}(In_2O_3)_{30}(ZrO_2)_{35}$, film thickness: 5 nm
 Dielectric Layer
  Material: $(ZnS)_{80}(SiO_2)_{20}$, film thickness: 12 nm
 Recording Layer
  Material: $Ge_{5.5}Sb_{75.6}Te_{18.9}$, film thickness: 11 nm
 First Dielectric Layer
  Material: $(ZnS)_{80}(SiO_2)_{20}$, film thickness: 20 nm
 Third Dielectric Layer
  Material: SiN, film thickness: 53 nm, 56 nm, 59 nm Comparative Example 2

The first information signal layer 2 was formed by the reflecting layer 21, the barrier layer 22, the dielectric layer 23, the recording layer 24, the first dielectric layer 25 and the third dielectric layer 27. An optical recording medium was obtained in the same manner as in Example 1, except that the material and the film thickness of each of these films constructing such a first information signal layer 2 were changed as follows.
 Reflecting Layer
  Material: Ag alloy, film thickness: 100 nm
 Barrier Layer
  Material: $(SiO_2)_{35}(In_2O_3)_{30}(ZrO_2)_{35}$, film thickness: 4 nm
 Dielectric Layer
  Material: $(ZnS)_{80}(SiO_2)_{20}$, film thickness: 11 nm
 Recording Layer
  Material: $Ge_{5.5}Sb_{75.6}Te_{18.9}$, film thickness: 11 nm
 First Dielectric Layer
  Material: $(ZnS)_{80}(SiO_2)_{20}$, film thickness: 15 nm
 Third Dielectric Layer
  Material: SiN, film thickness: 53 nm, 56 nm, 59 nm (Evaluation of BCA Modulation Degree)

By using an optical disc evaluation system (a trade name: ODU-1000, manufactured by Pulstec Industrial Co., Ltd.), each of the thus obtained samples was evaluated for the BCA modulation degree in the following manner. That is, a laser beam was focused on the BCA area while setting up a reproducing laser power at 0.3 mW, and a signal of the BCA mark was read, thereby evaluating the BCA modulation degree. The results obtained are shown in Table 1.

(Evaluation of Reflectance)

The reflectance of each of the thus obtained samples was measured in the following manner. That is, a tracking servo was applied at a radius of 28 mm, and a reflected light level from the grooves was read and converted into a reflectance. The conversion of the reflectance was carried out by installing an optical disk having a known reflectance in the same evaluation system, reading its reflected light level at a prescribed radius in the same manner as described above and determining a calibration curve between the reflectance and the reflected light level. The results obtained are shown in Table 1.

Figure 8:
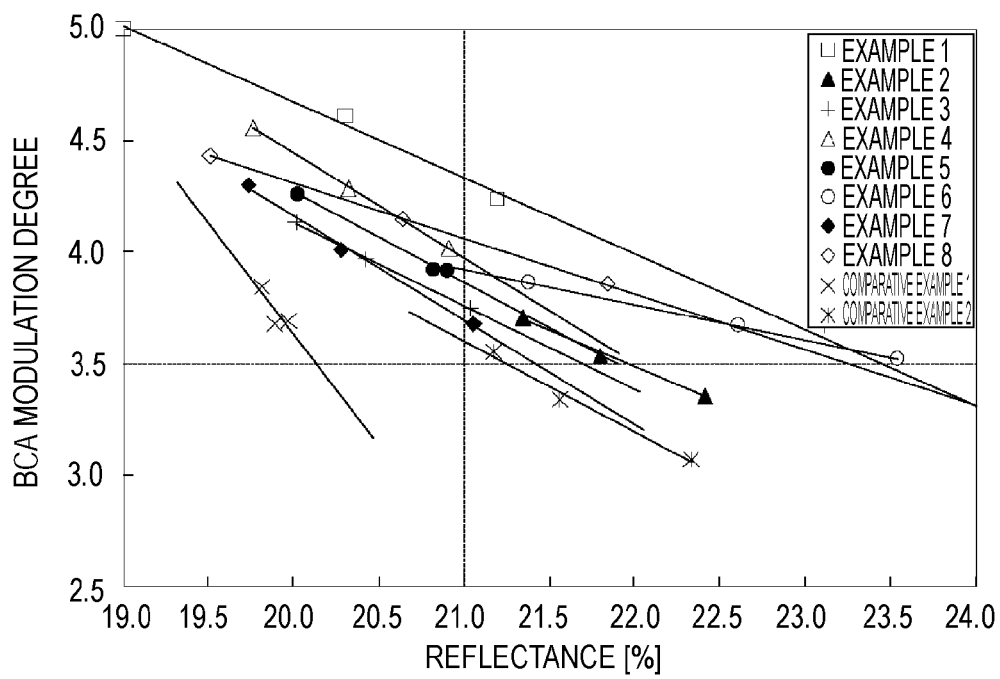
FIG. 8 is a graph showing a relationship between a reflectance and a BCA modulation degree in each of optical recording media according to Examples 1 to 8 and Comparative Examples 1 to 2.

Table 1 shows the evaluation results of the BCA modulation degree and the reflectance in each of Examples 1 to 8 and Comparative Examples 1 to 2. FIG. 8 shows a graph showing a relationship between the BCA modulation degree and the reflectance in each of Examples 1 to 8 and Comparative Examples 1 to 2. In FIG. 8, straight lines which are drawn as a standard at the BCA modulation degree of 3.5 and the reflectance of 21.0%, respectively show standard values required for the optical recording media (BD) according to the Examples of the present invention in view of the standards. That is, it is required that the BCA modulation degree of the optical recording media according to the Examples of the present invention is 3.5 or more in view of the standards and that the reflectance is 21.0% or more in view of the standards. This reflectance of 21.0% is a value obtained by converting a reflectance of 4.0%, which is required for a double-layer optical recording medium, into one in a single-layer optical recording medium.

TABLE 1

| | First dielectric layer Material/Film thickness | Second dielectric layer Material/Film thickness | Third dielectric layer Material/Film thickness | Reflectance | BCA modulation degree |
|---|---|---|---|---|---|
| Example 1 | $Si_3N_4$ 10 nm | $(ZnS)_{80}(SiO_2)_{20}$ 32 nm | $Si_3N_4$, 10 nm | 19.00% | 5.00 |
| | | | $Si_3N_4$, 13 nm | 20.30% | 4.61 |
| | | | $Si_3N_4$, 15 nm | 21.20% | 4.24 |
| Example 2 | $(ZnS)_{50}(SiO_2)_{50}$ 10 nm | $(ZnS)_{80}(SiO_2)_{20}$ 5 nm | $Si_3N_4$, 45 nm | 21.30% | 3.70 |
| | | | $Si_3N_4$, 47 nm | 21.80% | 3.53 |
| | | | $Si_3N_4$, 49 nm | 22.40% | 3.35 |
| Example 3 | $(ZnS)_{50}(SiO_2)_{50}$ 5 nm | $(ZnS)_{80}(SiO_2)_{20}$ 10 nm | $Si_3N_4$, 48 nm | 20.00% | 4.13 |
| | | | $Si_3N_4$, 50 nm | 20.40% | 3.97 |
| | | | $Si_3N_4$, 52 nm | 21.00% | 3.75 |
| Example 4 | $(ZnS)_{50}(SiO_2)_{50}$ 5 nm | $(ZnS)_{80}(SiO_2)_{20}$ 5 nm | $Si_3N_4$, 52 nm | 19.80% | 4.56 |
| | | | $Si_3N_4$, 54 nm | 20.30% | 4.28 |
| | | | $Si_3N_4$, 56 nm | 20.90% | 4.02 |
| Example 5 | $(ZnS)_{80}(SiO_2)_{20}$ 15 nm | $TiO_2$ 6 nm | $Si_3N_4$, 37 nm | 20.20% | 4.26 |
| | | | $Si_3N_4$, 40 nm | 20.80% | 3.92 |
| | | | $Si_3N_4$, 43 nm | 20.90% | 3.91 |
| Example 6 | $(ZnS)_{80}(SiO_2)_{20}$ 15 nm | $TiO_2$ 12 nm | $Si_3N_4$, 15 nm | 21.40% | 3.86 |
| | | | $Si_3N_4$, 18 nm | 22.60% | 3.67 |
| | | | $Si_3N_4$, 21 nm | 2.35% | 3.52 |
| Example 7 | $(ZnS)_{80}(SiO_2)_{20}$ 15 nm | $Nb_2O_5$ 8 nm | $Si_3N_4$, 37 nm | 19.70% | 4.30 |
| | | | $Si_3N_4$, 40 nm | 20.30% | 4.01 |
| | | | $Si_3N_4$, 43 nm | 21.10% | 3.68 |
| Example 8 | $(ZnS)_{80}(SiO_2)_{20}$ 15 nm | $Nb_2O_5$ 16 nm | $Si_3N_4$, 12 nm | 19.50% | 4.43 |
| | | | $Si_3N_4$, 15 nm | 20.60% | 4.15 |
| | | | $Si_3N_4$, 18 nm | 21.80% | 3.85 |

TABLE 1-continued

|  | First dielectric layer Material/Film thickness | Second dielectric layer Material/Film thickness | Third dielectric layer Material/Film thickness | Reflectance | BCA modulation degree |
|---|---|---|---|---|---|
| Comparative Example 1 | $(ZnS)_{80}(SiO_2)_{20}$ 20 nm | Nil | $Si_3N_4$, 53 nm | 19.80% | 3.85 |
|  |  |  | $Si_3N_4$, 56 nm | 20.00% | 3.69 |
|  |  |  | $Si_3N_4$, 59 nm | 19.90% | 3.68 |
| Comparative Example 2 | $(ZnS)_{80}(SiO_2)_{20}$ 15 nm | Nil | $Si_3N_4$, 53 nm | 21.20% | 3.55 |
|  |  |  | $Si_3N_4$, 56 nm | 21.60% | 3.34 |
|  |  |  | $Si_3N_4$, 59 nm | 22.30% | 3.07 |

Table 2 shows a refractive index of each of the respective dielectric layers of Examples 1 to 8 and Comparative Examples 1 to 2. The refractive index is a refractive index of light having a wavelength of 405 nm.

TABLE 2

|  | First dielectric layer Material/Film thickness | Second dielectric layer Material/Film thickness | Third dielectric layer Material/Film thickness |
|---|---|---|---|
| Example 1 | $Si_3N_4$ 1.96 | $(ZnS)_{80}(SiO_2)_{20}$ 2.3 | $Si_3N_4$ 1.96 |
| Example 2 | $(ZnS)_{50}(SiO_2)_{50}$ 1.89 | $(ZnS)_{80}(SiO_2)_{20}$ 2.3 | $Si_3N_4$ 1.96 |
| Example 3 | $(ZnS)_{50}(SiO_2)_{50}$ 1.89 | $(ZnS)_{80}(SiO_2)_{20}$ 2.3 | $Si_3N_4$ 1.96 |
| Example 4 | $(ZnS)_{50}(SiO_2)_{50}$ 1.89 | $(ZnS)_{80}(SiO_2)_{20}$ 2.3 | $Si_3N_4$ 1.96 |
| Example 5 | $(ZnS)_{80}(SiO_2)_{20}$ 2.3 | $TiO_2$ 2.65 | $Si_3N_4$ 1.96 |
| Example 6 | $(ZnS)_{80}(SiO_2)_{20}$ 2.3 | $TiO_2$ 2.65 | $Si_3N_4$ 1.96 |
| Example 7 | $(ZnS)_{80}(SiO_2)_{20}$ 2.3 | $Nb_2O_5$ 2.55 | $Si_3N_4$ 1.96 |
| Example 8 | $(ZnS)_{80}(SiO_2)_{20}$ 2.3 | $Nb_2O_5$ 2.55 | $Si_3N_4$ 1.96 |
| Comparative Example 1 | $(ZnS)_{80}(SiO_2)_{20}$ 2.3 | Nil | $Si_3N_4$ 1.96 |
| Comparative Example 2 | $(ZnS)_{80}(SiO_2)_{20}$ 2.3 | Nil | $Si_3N_4$ 1.96 |

The following are understood from Tables 1 and 2 and FIG. 8.

Comparative Example 1 is not able to satisfy such a range required in view of the standards that not only the BCA modulation degree of 3.5 or more, but the reflectance is 21.0% or more (this range will be hereinafter referred to as "standard range"). Also, Comparative Example 2 is able to satisfy the standard range within a very limited film thickness range. However, it deviates from the standard range by a slight change in the film thickness of the third dielectric layer or the like. That is, from the standpoint of actually mass-producing an optical recording medium, the film construction of Comparative Example 2 is not preferable.

On the other hand, Examples 1 to 8 are able to satisfy the standard range even by a change in the film thickness of the third dielectric layer or the like. In particular, Examples 1, 6 and 8 are able to satisfy the standard range over a wide film thickness range.

The first dielectric layer 25, the second dielectric layer 26 and the third dielectric layer 27 are continuously fabricated on the laser beam incident surface of the both principal surfaces of the recording layer 24, and the second dielectric layer 26 of these dielectric layers is made to have the highest refractive index. The second dielectric layer 26 having the highest refractive index is formed of at least one member selected from the group consisting of $TiO_2$, $Nb_2O_5$ and ZnS—$SiO_2$ so as to have a refractive index of 2.3 or more at a wavelength of 405 nm. According to this, it is possible to make both the reflectance and the BCA modulation degree compatible with each other.

By forming each of the first dielectric layer 25, the second dielectric layer 26 and the third dielectric layer 27 by a combination of a low refractive index layer (refractive index: less than 2.30) and a middle refractive index layer (refractive index: 2.30 or more and less than 2.55), it is possible to make both the reflectance and the BCA modulation degree compatible with each other. Also, even in the case of forming each of the first dielectric layer 25, the second dielectric layer 26 and the third dielectric layer 27 by a combination of a low refractive index layer (refractive index: less than 2.30), a middle refractive index layer (refractive index: 2.30 or more and less than 2.55) and a high refractive index layer (refractive index: 2.55 or more), it is possible to make both the reflectance and the BCA modulation degree compatible with each other.

(Evaluation of Storage Reliability)

Each of the thus obtained samples was subjected to an acceleration test for storing it in a thermostat at a temperature of 80° C. and a relative humidity of 80% for 200 hours. Among Examples 1 to 8 and Comparative Examples 1 to 2, the results of the acceleration test in Examples 1, 2 and 5 to 8 are representatively shown in FIGS. 9 to 14, respectively.

Also, the following are understood from FIGS. 9 to 14.

Figure 9:
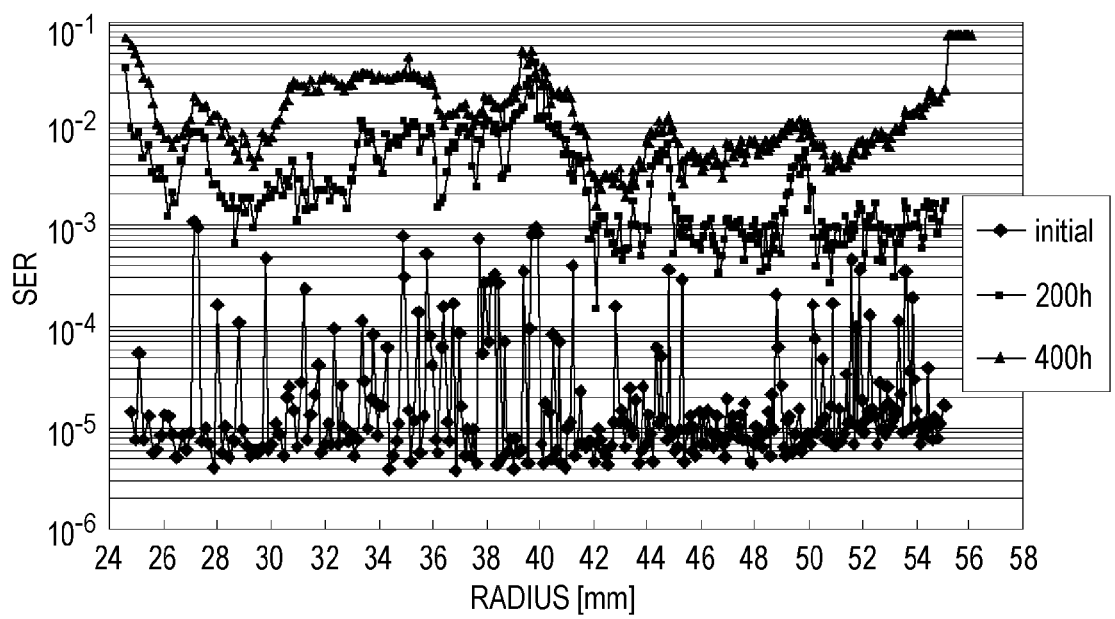
FIG. 9 is a graph showing SER before and after an acceleration test of an optical recording medium according to Example 1.

In Example 1 having a construction in which the first dielectric layer 25 made of SiN and the recording layer 24 come into contact with each other, there is a tendency that after the acceleration test, an increase in a signal error rate becomes remarkable (see FIG. 9).

Figure 10:
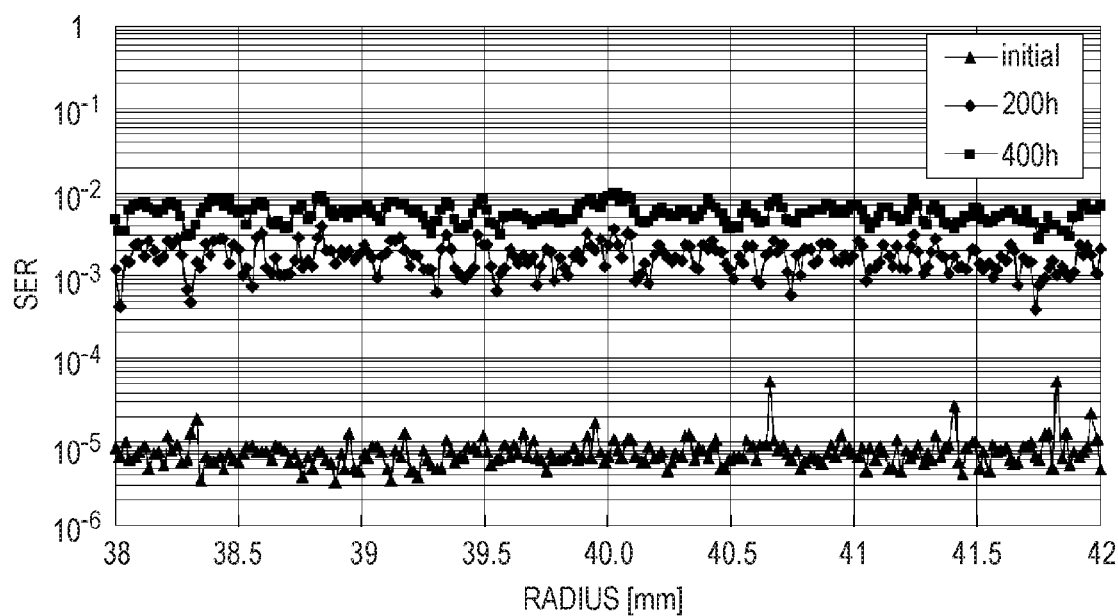
FIG. 10 is a graph showing SER before and after an acceleration test of an optical recording medium according to Example 2.
Figure 11:
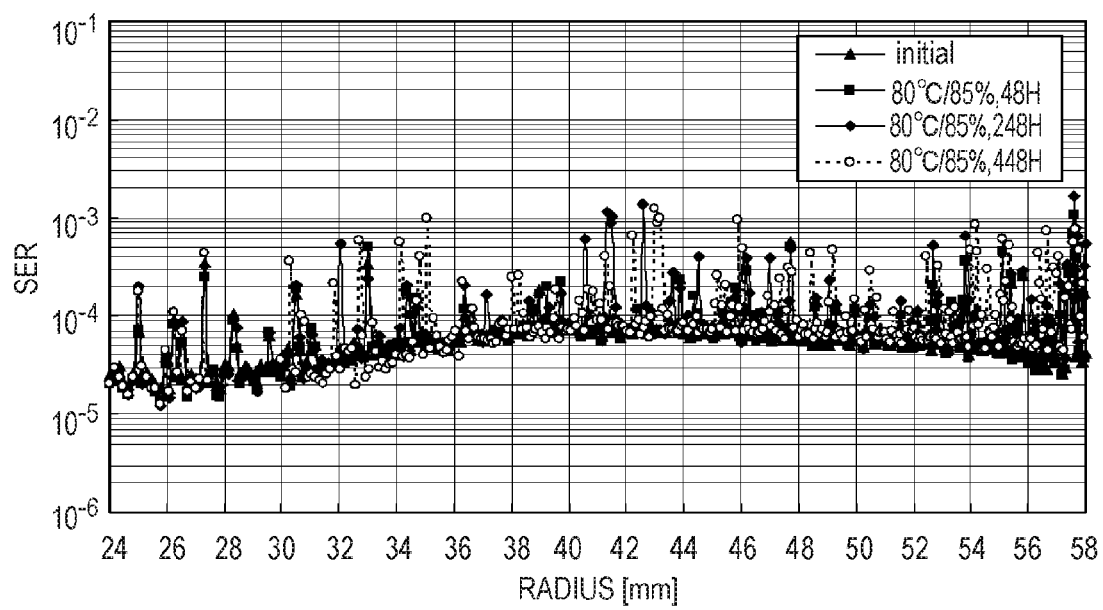
FIG. 11 is a graph showing SER before and after an acceleration test of an optical recording medium according to Example 5.
Figure 12:
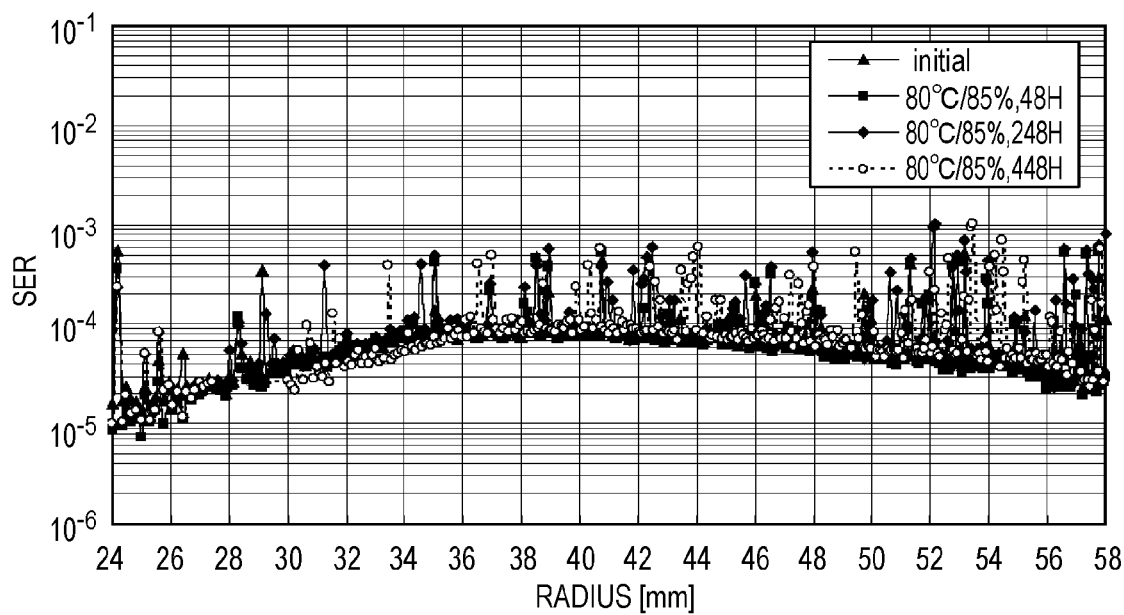
FIG. 12 is a graph showing SER before and after an acceleration test of an optical recording medium according to Example 6.
Figure 13:
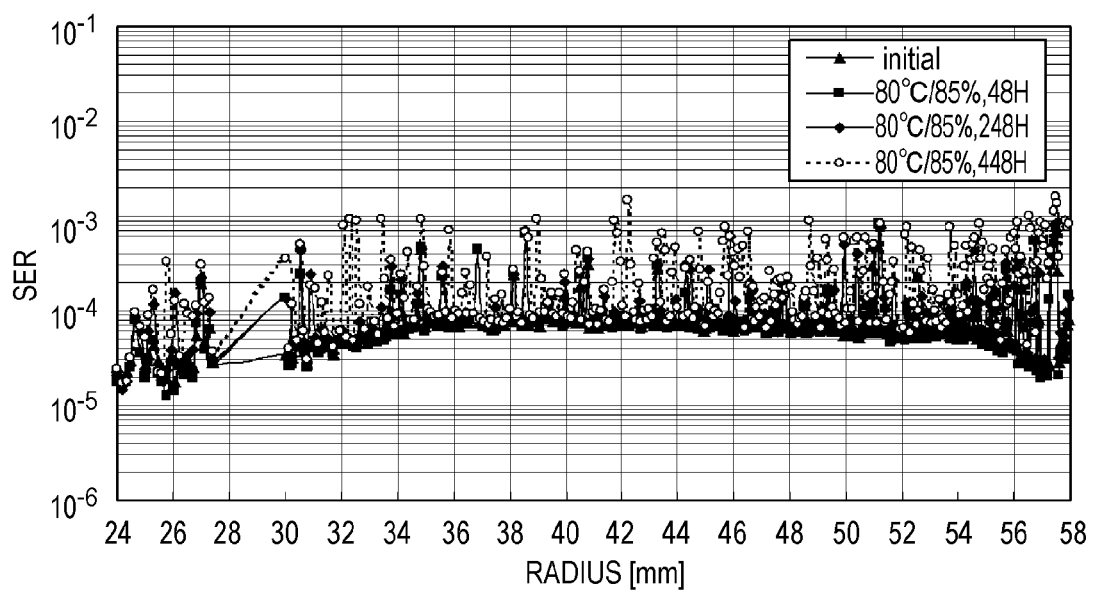
FIG. 13 is a graph showing SER before and after an acceleration test of an optical recording medium according to Example 7.
Figure 14:
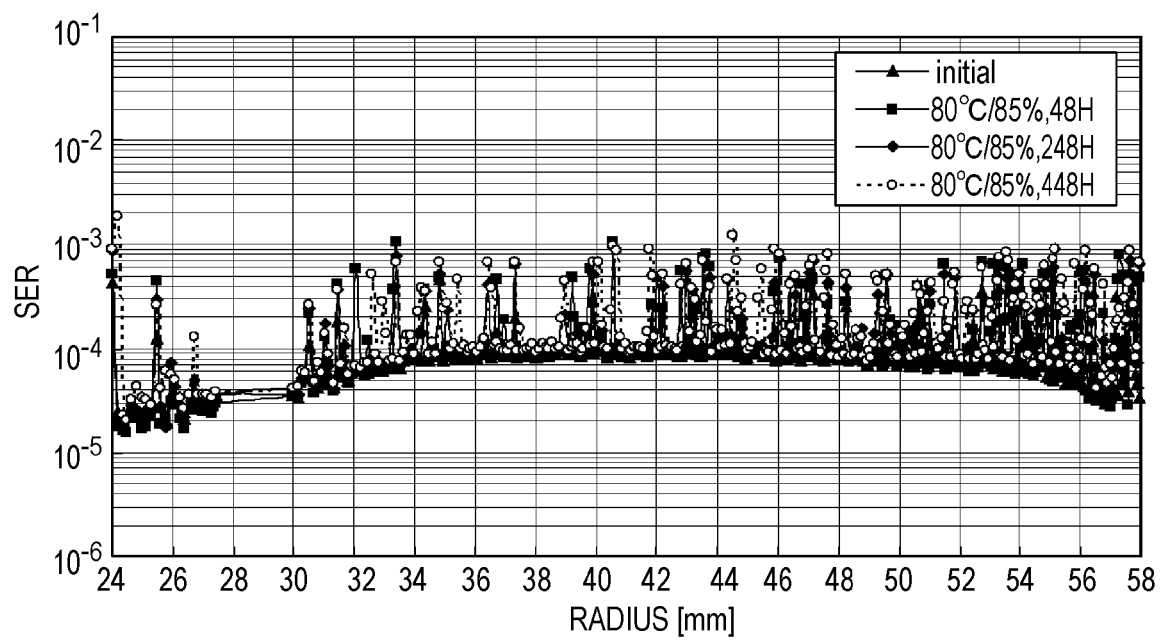
FIG. 14 is a graph showing SER before and after an acceleration test of an optical recording medium according to Example 8.
Figure 15A:
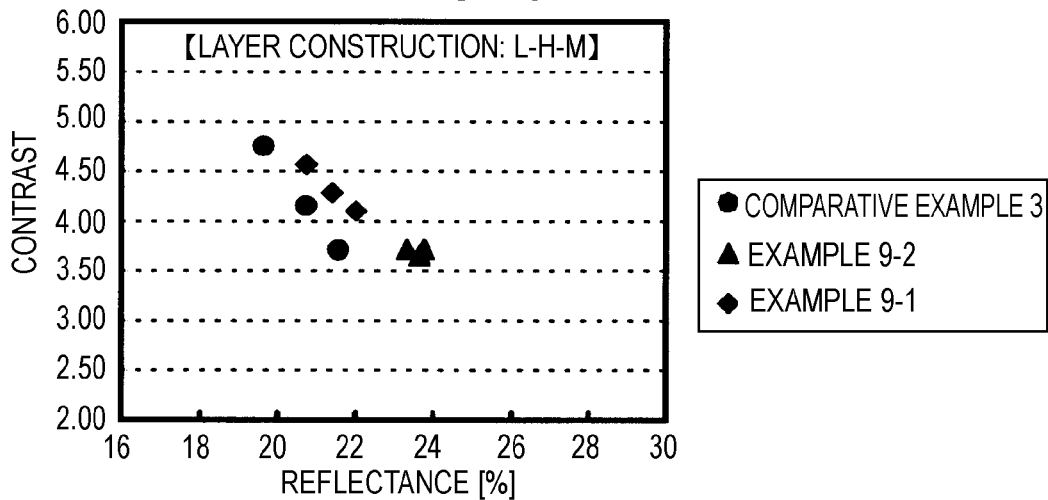
FIGS. 15A to 15C are each a graph showing a relationship between a contrast and a reflectance in Examples 9-1 to 11-2.
Figure 15B:
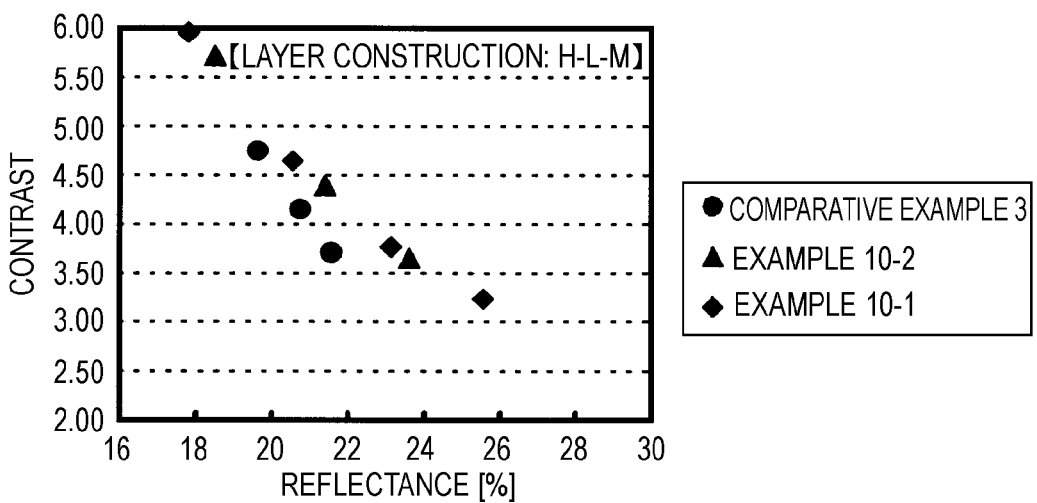
Figure 15C:
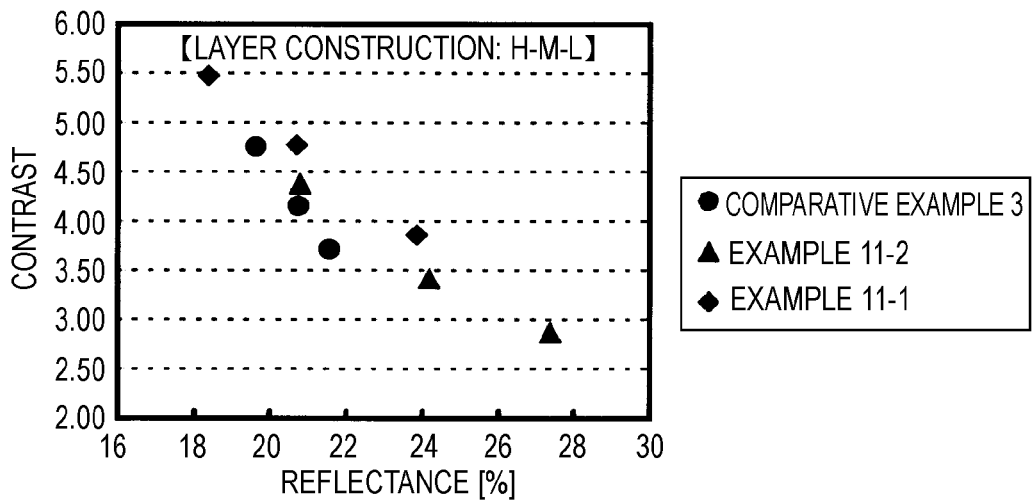
Figure 16A:
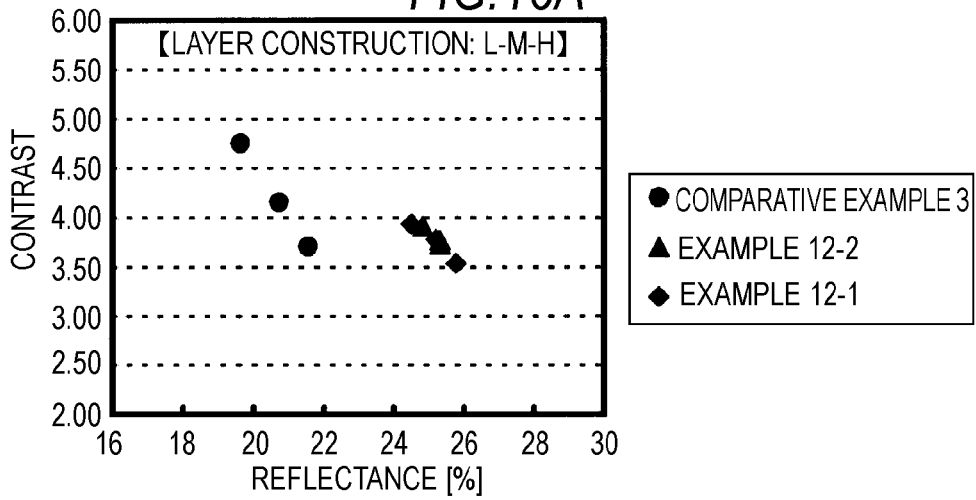
FIGS. 16A to 16C are each a graph showing a relationship between a contrast and a reflectance in Examples 12-1 to 14-2.
Figure 16B:
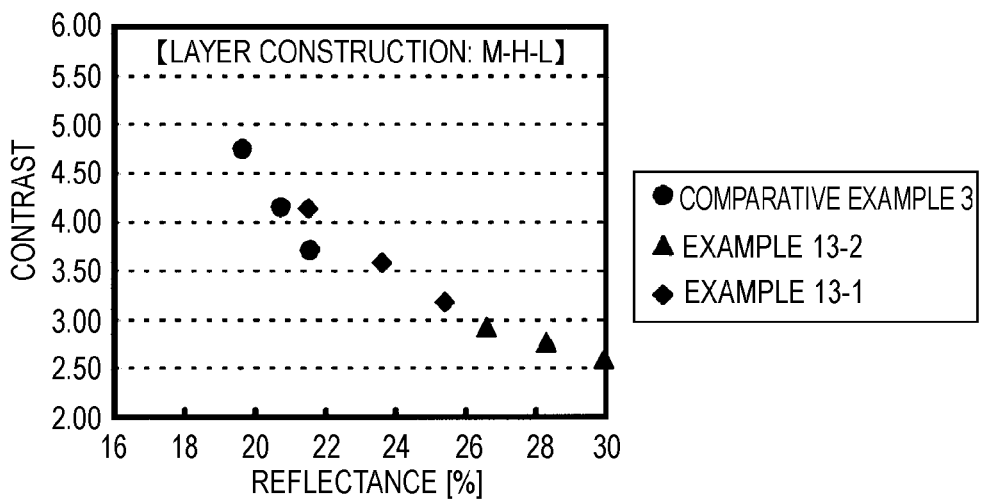
Figure 16C:
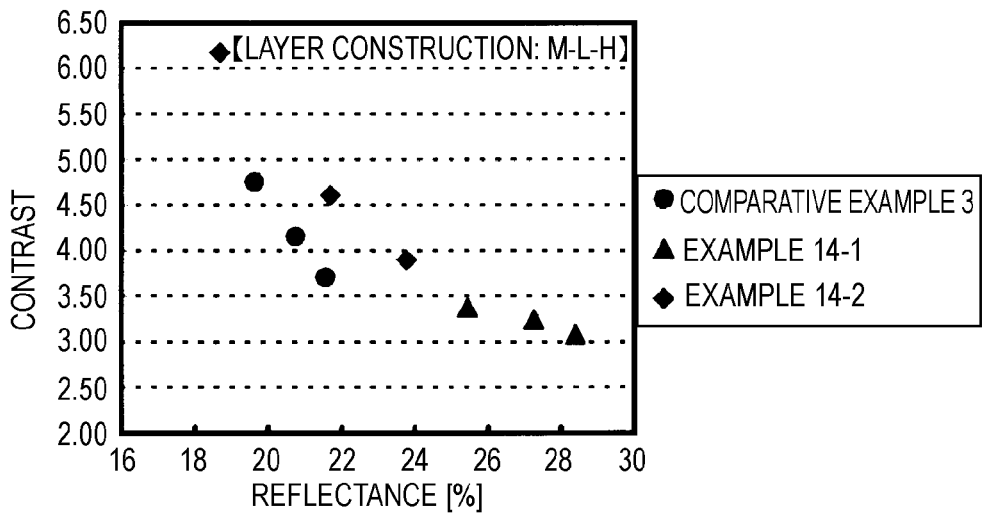
Figure 18:
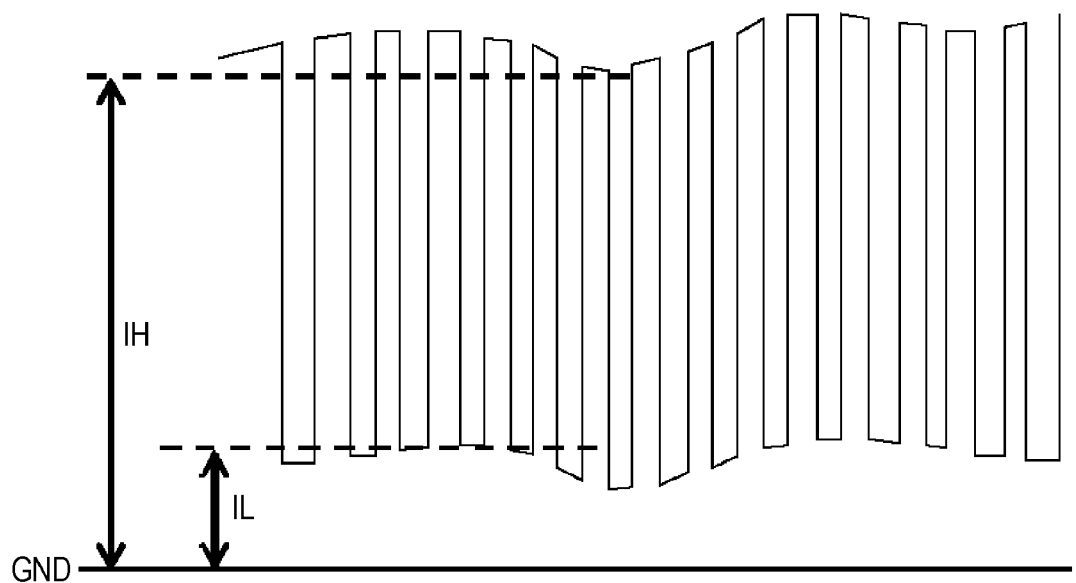
FIG. 18 is a waveform chart showing an example of a waveform of a reproduction signal of a BCA mark of a double-layer BD.
Figure 19:
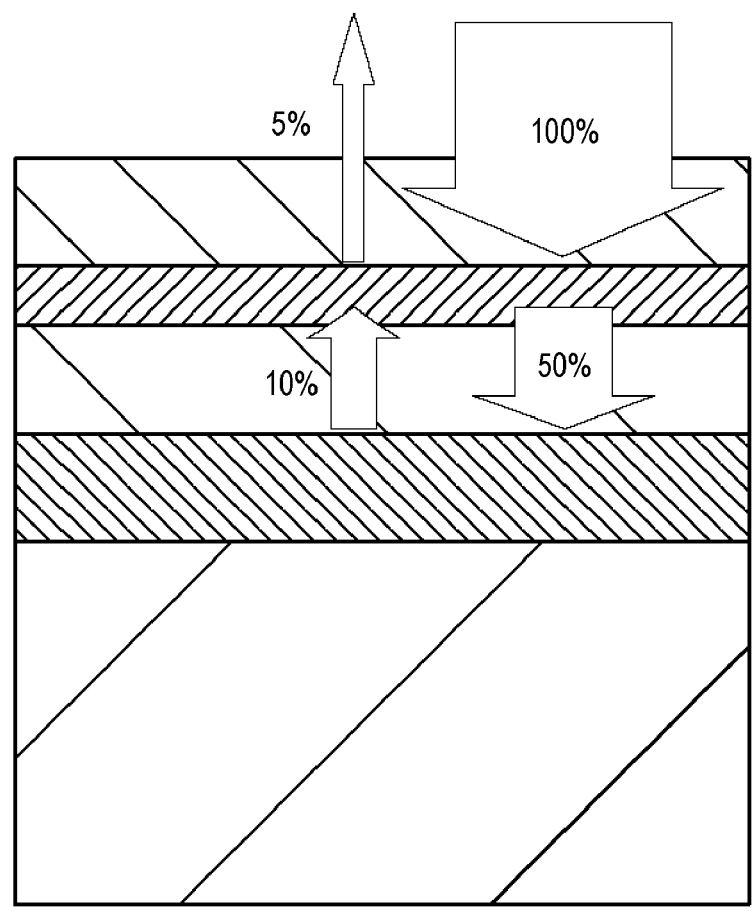
FIG. 19 is a diagrammatic sectional view showing a relationship between a transmittance and a reflectance in an L0 layer and an L1 layer.
Figure 20:
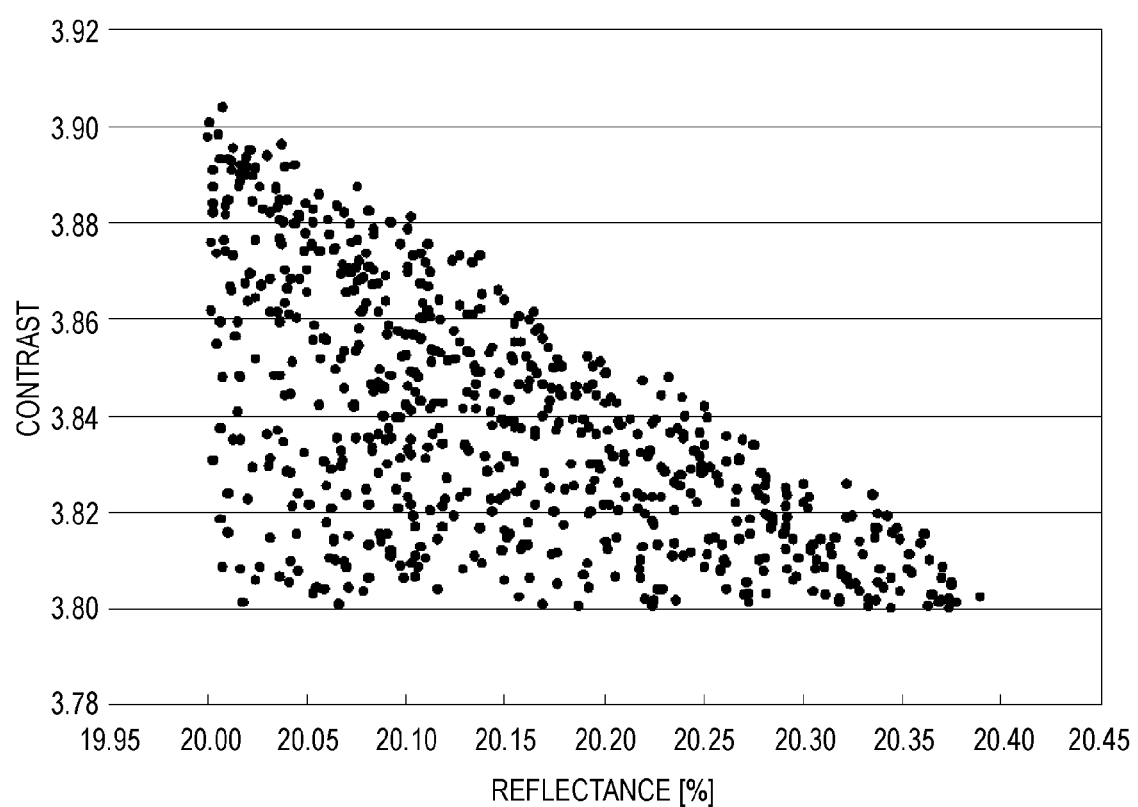
FIG. 20 is a graph showing a relationship between a reflectance and a contrast.

Also, even in Example 2 having a construction in which the first dielectric layer 25 made of $(ZnS)_{50}(SiO_2)_{50}$ and the recording layer 24 come into contact with each other, similar to Example 1, there is a tendency that after the acceleration test, an increase in a signal error rate becomes remarkable (see FIG. 10).

It may be considered that the increase in a signal error rate in Examples 1 and 2 is caused due to the fact that the first dielectric layer 25 made of SiN or $(ZnS)_{50}(SiO_2)_{50}$ has an action to accelerate crystallization of the recording mark formed in the recording layer 24.

On the other hand, in Examples 5 to 8 each having a construction in which the first dielectric layer 25 made of $(ZnS)_{80}(SiO_2)_{20}$ and the recording layer 24 come into contact with each other, there is a tendency that after the acceleration test, an increase in a signal error rate is suppressed (see FIGS. 11 to 14).

In the light of the above, from the viewpoint of making both the reflectance and the BCA modulation degree compatible with each other, it is preferable that not only the second dielectric layer is formed of, as a main component, at least one member selected from the group consisting of $TiO_2$, $Nb_2O_5$ and ZnS—$SiO_2$, but its refractive index is controlled to be 2.3 or more.

Also, from the viewpoint of storage reliability, it may be considered that it is preferable that not only the first dielectric layer 25 adjacent to the recording layer 24 is formed of ZnS—SiO$_2$, but it has a content of ZnS of 70 atomic % or more and not more than 90 atomic % and a content of SiO$_2$ of 10 atomic % or more and not more than 30 atomic %.

Example 9-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: (SiO$_2$)$_{35}$(In$_2$O$_3$)$_{30}$(ZrO$_2$)$_{35}$, film thickness: 4 nm
Dielectric Layer
Material: (ZnS)$_{80}$(SiO$_2$)$_{20}$, film thickness: 11 nm
Recording Layer
Material: Ge$_{5.5}$Sb$_{75.6}$Te$_{18.9}$, film thickness: 11 nm
First Dielectric Layer
Material: (ZnS)$_{80}$(SiO$_2$)$_{20}$, film thickness: 15 nm
Second Dielectric Layer
Material: TiO$_2$, film thickness: 6 nm
Third Dielectric Layer
Material: SiN, film thickness: 41 nm, 43 nm, 45 nm Example 9-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: (SiO$_2$)$_{35}$(In$_2$O$_3$)$_{30}$(ZrO$_2$)$_{35}$, film thickness: 4 nm
Dielectric Layer
Material: (ZnS)$_{80}$(SiO$_2$)$_{20}$, film thickness: 11 nm
Recording Layer
Material: Ge$_{5.5}$Sb$_{75.6}$Te$_{18.9}$, film thickness: 11 nm
First Dielectric Layer
Material: (ZnS)$_{80}$(SiO$_2$)$_{20}$, film thickness: 10 nm
Second Dielectric Layer
Material: TiO$_2$, film thickness: 16 nm
Third Dielectric Layer
Material: SiN, film thickness: 36 nm, 38 nm, 40 nm Example 10-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: (SiO$_2$)$_{35}$(In$_2$O$_3$)$_{30}$(ZrO$_2$)$_{35}$, film thickness: 4 nm
Dielectric Layer
Material: (ZnS)$_{80}$(SiO$_2$)$_{20}$, film thickness: 11 nm
Recording Layer
Material: Ge$_{5.5}$Sb$_{75.6}$Te$_{18.9}$, film thickness: 11 nm
First Dielectric Layer
Material: (ZnS)$_{80}$(SiO$_2$)$_{20}$, film thickness: 10 nm
Second Dielectric Layer
Material: SiN, film thickness: 24 nm
Third Dielectric Layer
Material: TiO$_2$, film thickness: 8 nm, 10 nm, 12 nm, 14 nm Example 10-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: (SiO$_2$)$_{35}$(In$_2$O$_3$)$_{30}$(ZrO$_2$)$_{35}$, film thickness: 4 nm
Dielectric Layer
Material: (ZnS)$_{80}$(SiO$_2$)$_{20}$, film thickness: 11 nm
Recording Layer
Material: Ge$_{5.5}$Sb$_{75.6}$Te$_{18.9}$, film thickness: 11 nm
First Dielectric Layer
Material: (ZnS)$_{80}$(SiO$_2$)$_{20}$, film thickness: 30 nm
Second Dielectric Layer
Material: SiN, film thickness: 18 nm
Third Dielectric Layer
Material: TiO$_2$, film thickness: 2 nm, 4 nm, 6 nm Example 11-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: (SiO$_2$)$_{35}$(In$_2$O$_3$)$_{30}$(ZrO$_2$)$_{35}$, film thickness: 4 nm
Dielectric Layer
Material: (ZnS)$_{80}$(SiO$_2$)$_{20}$, film thickness: 11 nm
Recording Layer
Material: Ge$_{5.5}$Sb$_{75.6}$Te$_{18.9}$, film thickness: 11 nm
First Dielectric Layer
Material: SiN, film thickness: 60 nm
Second Dielectric Layer
Material: (ZnS)$_{80}$(SiO$_2$)$_{20}$, film thickness: 52 nm
Third Dielectric Layer
Material: TiO$_2$, film thickness: 24 nm, 26 nm, 28 nm Example 11-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: (SiO$_2$)$_{35}$(In$_2$O$_3$)$_{30}$(ZrO$_2$)$_{35}$, film thickness: 4 nm Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: SiN, film thickness: 22 nm
Second Dielectric Layer
Material: $(ZnS)_{80}(SiO_2)_{20}$, film thickness: 10 nm
Third Dielectric Layer
Material: $TiO_2$, film thickness: 6 nm, 8 nm, 10 nm Example 12-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $TiO_2$, film thickness: 4 nm
Second Dielectric Layer
Material: $(ZnS)_{80}(SiO_2)_{20}$, film thickness: 30 nm
Third Dielectric Layer
Material: SiN, film thickness: 22 nm, 26 nm, 30 nm Example 12-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $TiO_2$, film thickness: 16 nm
Second Dielectric Layer
Material: $(ZnS)_{80}(SiO_2)_{20}$, film thickness: 20 nm
Third Dielectric Layer
Material: SiN, film thickness: 26 nm, 28 nm, 30 nm Example 13-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: SiN, film thickness: 30 nm
Second Dielectric Layer
Material: $TiO_2$, film thickness: 8 nm
Third Dielectric Layer
Material: $(ZnS)_{80}(SiO_2)_{20}$, film thickness: 2 nm, 4 nm, 6 nm Example 13-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: SiN, film thickness: 22 nm
Second Dielectric Layer
Material: $TiO_2$, film thickness: 12 nm
Third Dielectric Layer
Material: $(ZnS)_{80}(SiO_2)_{20}$, film thickness: 4 nm, 6 nm, 8 nm Example 14-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.
Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $TiO_2$, film thickness: 20 nm
Second Dielectric Layer
Material: SiN, film thickness: 18 nm
Third Dielectric Layer
Material: $(ZnS)_{80}(SiO_2)_{20}$, film thickness: 13 nm, 16 nm, 19 nm Example 14-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.

Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $TiO_2$, film thickness: 4 nm
Second Dielectric Layer
Material: SiN, film thickness: 22 nm
Third Dielectric Layer
Material: $(ZnS)_{80}(SiO_2)_{20}$, film thickness: 17 nm, 20 nm, 23 nm Example 15-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.

Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 12 nm
Second Dielectric Layer
Material: SiN, film thickness: 12 nm
Third Dielectric Layer
Material: $(ZnS)_{80}(SiO_2)_{20}$, film thickness: 19 nm, 22 nm, 25 nm Example 15-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.

Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 18 nm
Second Dielectric Layer
Material: SiN, film thickness: 18 nm
Third Dielectric Layer
Material: $(ZnS)_{80}(SiO_2)_{20}$, film thickness: 11 nm, 14 nm, 17 nm Example 16-1

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.

Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: SiN, film thickness: 20 nm
Second Dielectric Layer
Material: $(ZnS)_{80}(SiO_2)_{20}$, film thickness: 18 nm
Third Dielectric Layer
Material: SiN, film thickness: 6 nm, 10 nm, 14 nm Example 16-2

An optical recording medium was obtained in the same manner as in Example 1, except that the material and the film thickness of each of the reflecting layer 21, the barrier layer 22, the dielectric layer 23, the recording layer 24, the first dielectric layer 25, the second dielectric layer 26 and the third dielectric layer 27 were changed as follows.

Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: SiN, film thickness: 6 nm
Second Dielectric Layer
Material: $(ZnS)_{80}(SiO_2)_{20}$, film thickness: 28 nm
Third Dielectric Layer
Material: SiN, film thickness: 16 nm, 20 nm, 24 nm Comparative Example 3

An optical recording medium was obtained in the same manner as in Example 1, except that the material and the film thickness of each of the reflecting layer 21, the barrier layer 22, the dielectric layer 23, the recording layer 24, the first dielectric layer 25 and the third dielectric layer 27 were changed as follows.

Reflecting Layer
Material: Ag alloy, film thickness: 100 nm
Barrier Layer
Material: $(SiO_2)_{35}(In_2O_3)_{30}(ZrO_2)_{35}$, film thickness: 4 nm
Dielectric Layer
Material: $(ZnS)_{80}(SiO_2)_{20}$, film thickness: 11 nm
Recording Layer
Material: $Ge_{5.5}Sb_{75.6}Te_{18.9}$, film thickness: 11 nm
First Dielectric Layer
Material: $(ZnS)_{80}(SiO_2)_{20}$, film thickness: 15 nm
Third Dielectric Layer
Material: SiN, film thickness: 52 nm, 56 nm, 60 nm (Reflectance Rc and Reflectance Ra)

Though the recording film immediately after the fabrication was in an amorphous state, the sample was made in a crystalline state upon being irradiated with an adequate laser power by using an initialization system (initialization). In this evaluation, a part of the area of the disc was retained in an amorphous state without being initialized. The evaluation of the reflectance was carried out by using an optical disc evaluation system (a trade name: ODU-1000, manufactured by Pulstec Industrial Co., Ltd.), applying a tracking servo to the initialized (crystallized) area and defining a reflectance converted from the reflected light level in an unrecorded state as Rc and a reflectance converted from a signal level in the case of focusing into an uninitialized (amorphous) area as Ra, respectively. The conversion of the reflectance is carried out by determining a calibration curve from a signal level measured in a disc sample having a known reflectance. The results obtained are shown in Table 3.

(Evaluation of Contrast)

The contrast which is defined in terms of a ratio between the reflectance Rc of the initialized area and the reflectance Ra of the uninitialized area is calculated from a ratio of the respective reflectances determined in the manner as described above.

Table 3 shows the evaluation results of the contrast and the reflectance in each of Examples 9-1 to 16-2 and Comparative Example 3. Each of FIGS. 15A to 17C is a graph showing a relationship between the contrast and the reflectance of each of Examples 9-1 to 16-2 and Comparative Example 3.

TABLE 3

| Layer construction | | Central film thickness | SiN film thickness | IH | Reflectance Rc | IL | Reflectance Ra | Contrast |
|---|---|---|---|---|---|---|---|---|
| L-H-M | Example 9-1 | 43-6-15 | 41 nm | 507 mV | 20.7% | 111 mV | 4.54% | 4.57 |
| | | | 43 nm | 523 mV | 21.4% | 122 mV | 4.99% | 4.29 |
| | | | 45 nm | 538 mV | 22.0% | 131 mV | 5.36% | 4.11 |
| | Example 9-2 | 38-16-10 | 36 nm | 570 mV | 23.3% | 153 mV | 6.26% | 3.73 |
| | | | 38 nm | 578 mV | 23.6% | 158 mV | 6.46% | 3.66 |
| | | | 40 nm | 581 mV | 23.8% | 156 mV | 6.38% | 3.72 |
| H-L-M | Example 10-1 | 10-24-10 | 8 nm | 435 mV | 17.8% | 73 mV | 2.99% | 5.96 |
| | | | 10 nm | 502 mV | 20.5% | 108 mV | 4.42% | 4.65 |
| | | | 12 nm | 565 mV | 23.1% | 150 mV | 6.14% | 3.77 |
| | | | 14 nm | 625 mV | 25.6% | 193 mV | 7.89% | 3.24 |
| | Example 10-2 | 4-18-30 | 2 nm | 452 mV | 18.5% | 79 mV | 3.23% | 5.72 |
| | | | 4 nm | 523 mV | 21.4% | 119 mV | 4.87% | 4.39 |
| | | | 6 nm | 577 mV | 23.6% | 158 mV | 6.46% | 3.65 |
| H-M-L | Example 11-1 | 26-52-60 | 24 nm | 449 mV | 18.4% | 82 mV | 3.35% | 5.48 |
| | | | 26 nm | 506 mV | 20.7% | 106 mV | 4.34% | 4.77 |
| | | | 28 nm | 583 mV | 23.8% | 151 mV | 6.18% | 3.86 |
| | Example 11-2 | 8-10-22 | 6 nm | 508 mV | 20.8% | 116 mV | 4.74% | 4.38 |
| | | | 8 nm | 591 mV | 24.2% | 173 mV | 7.08% | 3.42 |
| | | | 10 nm | 669 mV | 27.4% | 233 mV | 9.53% | 2.87 |
| L-M-H | Example 12-1 | 26-30-4 | 22 nm | 599 mV | 24.5% | 152 mV | 6.22% | 3.94 |
| | | | 26 nm | 616 mV | 25.2% | 163 mV | 6.67% | 3.78 |
| | | | 30 nm | 630 mV | 25.8% | 178 mV | 7.28% | 3.54 |
| | Example 12-2 | 28-20-16 | 24 nm | 619 mV | 25.3% | 166 mV | 6.79% | 3.73 |
| | | | 28 nm | 619 mV | 25.3% | 164 mV | 6.71% | 3.77 |
| | | | 32 nm | 607 mV | 24.8% | 155 mV | 6.34% | 3.92 |
| M-H-L | Example 13-1 | 4-8-30 | 2 nm | 526 mV | 21.5% | 127 mV | 5.19% | 4.14 |
| | | | 4 nm | 577 mV | 23.6% | 161 mV | 6.58% | 3.58 |
| | | | 6 nm | 621 mV | 25.4% | 195 mV | 7.98% | 3.18 |
| | Example 13-2 | 6-12-22 | 4 nm | 650 mV | 26.6% | 222 mV | 9.08% | 2.93 |
| | | | 6 nm | 692 mV | 28.3% | 250 mV | 10.23% | 2.77 |
| | | | 8 nm | 732 mV | 29.9% | 282 mV | 11.53% | 2.60 |
| M-L-H | Example 14-1 | 16-18-20 | 13 nm | 694 mV | 28.4% | 225 mV | 9.20% | 3.08 |
| | | | 16 nm | 666 mV | 27.2% | 205 mV | 8.38% | 3.25 |
| | | | 19 nm | 622 mV | 25.4% | 184 mV | 7.35% | 3.38 |
| | Example 14-2 | 20-22-4 | 17 nm | 457 mV | 18.7% | 74 mV | 3.03% | 6.18 |
| | | | 20 nm | 530 mV | 21.7% | 115 mV | 4.70% | 4.61 |
| | | | 23 nm | 581 mV | 23.8% | 149 mV | 6.09% | 3.90 |
| M-L-M | Example 15-1 | 22-12-12 | 19 nm | 422 mV | 17.3% | 67 mV | 2.74% | 6.30 |
| | | | 22 nm | 499 mV | 20.4% | 105 mV | 4.29% | 4.75 |
| | | | 25 nm | 567 mV | 23.2% | 146 mV | 5.97% | 3.88 |
| | Example 15-2 | 14-18-18 | 11 nm | 426 mV | 17.4% | 78 mV | 3.19% | 5.46 |
| | | | 14 nm | 505 mV | 20.7% | 114 mV | 4.66% | 4.43 |
| | | | 17 nm | 590 mV | 24.1% | 170 mV | 6.95% | 3.47 |
| L-M-L | Example 16-1 | 10-18-20 | 6 nm | 513 mV | 21.0% | 117 mV | 4.79% | 4.38 |
| | | | 10 nm | 542 mV | 22.2% | 134 mV | 5.48% | 4.04 |
| | | | 14 nm | 567 mV | 23.2% | 157 mV | 6.42% | 3.61 |
| | Example 16-2 | 20-28-6 | 16 nm | 456 mV | 18.7% | 86 mV | 3.52% | 5.30 |
| | | | 20 nm | 509 mV | 20.8% | 118 mV | 4.83% | 4.31 |
| | | | 24 nm | 542 mV | 22.2% | 141 mV | 5.77% | 3.84 |
| | Comparative Example 3 | 56-15 | 52 nm | 480 mV | 19.6% | 101 mV | 4.13% | 4.75 |
| | | | 56 nm | 507 mV | 20.7% | 122 mV | 4.99% | 4.16 |
| | | | 60 nm | 527 mV | 21.6% | 142 mV | 5.81% | 3.71 |

The following are understood from Table 3 and FIGS. 15A to 17C.

Even in the case where the refractive index of the dielectric layer other than the second dielectric layer 26, namely the first dielectric layer 25 or the third dielectric layer 27, is made the highest among the three laminated dielectric layers, it is possible to make both the reflectance and the BCA modulation degree compatible with each other.

In particular, when refractive indexes of the first dielectric layer 25, the second dielectric layer 26 and the third dielectric layer 27 are defined as $n_1$, $n_2$ and $n_3$, respectively, by allowing the refractive indexes $n_1$, $n_2$ and $n_3$ to satisfy with a relationship of $n_1 > n_2 > n_3$, the effect for enhancing high reflectance and high contrast becomes remarkable.

Also, determining from the evaluation results of the foregoing Examples, even in the case where embodiments of the present invention are applied to an optical recording medium constructed by a single layer or three or more layers, it is understood that both high reflectance and high contrast can be made compatible with each other.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

For example, the numerical values described in the foregoing embodiments are merely an example, and different numerical values may be used, if desired.

Furthermore, in the foregoing embodiments and working examples, while the case where the present invention is applied to a rewritable type optical recording medium has been described as an example, the present invention is also applicable to a read-only optical recording medium and a recordable optical recording medium.

Furthermore, in the foregoing embodiments and working examples, while the case where the present invention is applied to an optical recording medium in which recording or reproduction of information signals is executed by irradiating a laser beam on the information signal layer from the interlayer or cover layer side has been described as an example, it should not be construed that the present invention is limited to this example. For example, the present invention is also applicable to an optical recording medium having an information signal layer on a substrate, in which recording or reproduction of information signals is executed by irradiating a laser beam on the information signal layer from the side of the substrate. Moreover, the present invention is also applicable to an optical recording medium having two sheets of substrates stuck to each other, in which recording or reproduction is executed by irradiating a laser beam on an information signal layer located between the substrates from the side of one of the substrates.

Furthermore, in the foregoing embodiments and working examples, while the case where the present invention is applied to an optical recording medium provided with two information signal layers has been described as an example, the present invention is also applicable to an optical recording medium provided with three or more information signal layers as well as an optical recording medium provided with a signal information signal layer.

The invention claimed is:

1. An optical recording medium comprising:
a substrate;
an information signal layer provided on the substrate; and
a protective layer provided on the information signal layer, wherein
the information signal layer is provided with
a reflecting layer,
a recording layer provided on the reflecting layer and
a first dielectric layer, a second dielectric layer and a third dielectric layer laminated successively on the recording layer,
refractive indexes of the first dielectric layer, the second dielectric layer and the third dielectric layer are different from each other between the adjacent dielectric layers to each other,
among the first dielectric layer, the second dielectric layer and the third dielectric layer, the dielectric layer having the highest refractive index contains, as a main component, at least one member selected from the group consisting of titanium oxide, niobium oxide and a mixture of zinc sulfide and silicon oxide, and
the dielectric layer having the highest refractive index has a refractive index of 2.3 or more at a wavelength of 405 nm, and
when refractive indexes of the first dielectric layer, the second dielectric layer and the third dielectric layer are defined as $n_1$, $n_2$ and $n_3$, respectively, the refractive indexes $n_1$, $n_2$ and $n_3$ are satisfied with a relationship of $n_1 > n_2 > n_3$.

2. An optical recording medium comprising:
a substrate;
an information signal layer provided on the substrate; and
a protective layer provided on the information signal layer, wherein
the information signal layer is provided with
a reflecting layer,
a recording layer provided on the reflecting layer and
a first dielectric layer, a second dielectric layer and a third dielectric layer laminated successively on the recording layer,
refractive indexes of the first dielectric layer, the second dielectric layer and the third dielectric layer are different from each other between the adjacent dielectric layers to each other,
among the first dielectric layer, the second dielectric layer and the third dielectric layer, the dielectric layer having the highest refractive index contains, as a main component, at least one member selected from the group consisting of titanium oxide, niobium oxide and a mixture of zinc sulfide and silicon oxide, and
the dielectric layer having the highest refractive index has a refractive index of 2.3 or more at a wavelength of 405 nm, and
when refractive indexes of the first dielectric layer, the second dielectric layer and the third dielectric layer are defined as $n_1$, $n_2$ and $n_3$, respectively, the refractive indexes $n_1$, $n_2$ and $n_3$ are satisfied with a relationship of $n_2 > n_1$ and $n_2 > n_3$.

3. The optical recording medium according to claim 1, wherein
the laminated film of the first dielectric layer, the second dielectric layer and the third dielectric layer is a laminated film obtained by laminating three layers of at least two kinds of layers of a low refractive index layer, a middle refractive index layer and a high refractive index layer;
a refractive index of the low refractive index layer is less than 2.30 at a wavelength of 405 nm;
a refractive index of the middle refractive index layer is 2.30 or more and less than 2.55 at a wavelength of 405 nm; and a refractive index of the high refractive index layer is 2.55 or more at a wavelength of 405 nm.

4. The optical recording medium according to claim 1, wherein a content of the zinc sulfide is 70 atomic % or more and not more than 90 atomic %, and a content of the silicon oxide is 10 atomic % or more and not more than 30 atomic %.

5. The optical recording medium according to claim 1, wherein the substrate has a first area and a second area; and plural grooves extending in the radial direction of the substrate are arranged in the first area of the substrate.

6. The optical recording medium according to claim 5, wherein a recording mark traversing the plural grooves is formed in the recording layer of the first area.

7. The optical recording medium according to claim 6, wherein the recording mark has a rectangular shape.

8. The optical recording medium according to claim 1, wherein the substrate has a first area and a second area;

plural grooves extending in the radial direction of the substrate are arranged in the first area and second area of the substrate, respectively; and the grooves of the first area is shallower or narrower than those of the second area.

9. The optical recording medium according to claim 1, wherein an information signal layer is further provided between the information signal layer and the protective layer.

10. The optical recording medium according to claim 1, wherein the recording layer contains a eutectic system phase change material.

11. A method for manufacturing an optical recording medium comprising:

forming an information signal layer on a substrate; and forming a protective layer on the information signal layer, wherein the formation of an information signal layer includes successive lamination of a recording layer, a first dielectric layer, a second dielectric layer and a third dielectric layer on a substrate, refractive indexes of the first dielectric layer, the second dielectric layer and the third dielectric layer are different from each other between the adjacent dielectric layers to each other, among the first dielectric layer, the second dielectric layer and the third dielectric layer, the dielectric layer having the highest refractive index contains, as a main component, at least one member selected from the group consisting of titanium oxide, niobium oxide and a mixture of zinc sulfide and silicon oxide, and the dielectric layer having the highest refractive index has a refractive index of 2.3 or more at a wavelength of 405 nm, and when refractive indexes of the first dielectric layer, the second dielectric layer and the third dielectric layer are defined as $n_1$, $n_2$ and $n_3$, respectively, the refractive indexes $n_1$, $n_2$ and $n_1$ are satisfied with a relationship of $n_1 > n_2 > n_3$.

12. An optical recording medium comprising:

a substrate;

an information signal layer provided on the substrate; and a protective layer provided on the information signal layer, wherein the information signal layer is provided with:

a reflecting layer, a recording layer provided on the reflecting layer and a first dielectric layer, a second dielectric layer and a third dielectric layer laminated successively on the recording layer, refractive indexes of the first dielectric layer, the second dielectric layer and the third dielectric layer are different from each other between the adjacent dielectric layers to each other, and among the first dielectric layer, the second dielectric layer and the third dielectric layer, the dielectric layer having the highest refractive index has a refractive index of 2.3 or more at a wavelength of 405 nm, and when refractive indexes of the first dielectric layer, the second dielectric layer and the third dielectric layer are defined as $n_1$, $n_2$ and $n_3$, respectively, the refractive indexes $n_1$, $n_2$ and $n_3$ are satisfied with a relationship of $n_1 > n_2 > n_3$.

13. A method for manufacturing an optical recording medium comprising:

forming an information signal layer on a substrate; and forming a protective layer on the information signal layer, wherein the formation of an information signal layer includes successive lamination of a recording layer, a first dielectric layer, a second dielectric layer and a third dielectric layer on a substrate, refractive indexes of the first dielectric layer, the second dielectric layer and the third dielectric layer are different from each other between the adjacent dielectric layers to each other, among the first dielectric layer, the second dielectric layer and the third dielectric layer, the dielectric layer having the highest refractive index contains, as a main component, at least one member selected from the group consisting of titanium oxide, niobium oxide and a mixture of zinc sulfide and silicon oxide, and the dielectric layer having the highest refractive index has a refractive index of 2.3 or more at a wavelength of 405 nm, and when refractive indexes of the first dielectric layer, the second dielectric layer and the third dielectric layer are defined as $n_1$, $n_2$ and $n_3$, respectively, the refractive indexes $n_1$, $n_2$ and $n_3$ are satisfied with a relationship of $n_2 > n_1$ and $n_2 > n_3$.

14. An optical recording medium comprising:

a substrate;

an information signal layer provided on the substrate; and a protective layer provided on the information signal layer, wherein the information signal layer is provided with:

a reflecting layer, a recording layer provided on the reflecting layer and a first dielectric layer, a second dielectric layer and a third dielectric layer laminated successively on the recording layer, refractive indexes of the first dielectric layer, the second dielectric layer and the third dielectric layer are different from each other between the adjacent dielectric layers to each other, and among the first dielectric layer, the second dielectric layer and the third dielectric layer, the dielectric layer having the highest refractive index has a refractive index of 2.3 or more at a wavelength of 405 nm, and when refractive indexes of the first dielectric layer, the second dielectric layer and the third dielectric layer are defined as $n_1$, $n_2$ and $n_3$, respectively, the refractive indexes $n_1$, $n_2$ and $n_3$ are satisfied with a relationship of $n_2 > n_1$ and $n_2 > n_3$.

* * * * *